(12) United States Patent
Denvir et al.

(10) Patent No.: US 9,932,252 B2
(45) Date of Patent: Apr. 3, 2018

(54) SYSTEM AND METHOD FOR TREATING WATER SYSTEMS WITH HIGH VOLTAGE DISCHARGE AND OZONE

(71) Applicant: NCH Corporation, Irving, TX (US)

(72) Inventors: Adrian J. Denvir, Richardson, TX (US); David F. Vela, Irving, TX (US); Matthew C. Holloway, Fort Worth, TX (US); William P. Boesch, Dallas, TX (US); Jose E. Evaro, Mansfield, TX (US)

(73) Assignee: NCH Corporation, Irving, TX (US)

( * ) Notice: Subject to any disclaimer, the term of this patent is extended or adjusted under 35 U.S.C. 154(b) by 455 days.

(21) Appl. No.: 14/695,519

(22) Filed: Apr. 24, 2015

(65) Prior Publication Data

US 2015/0232353 A1     Aug. 20, 2015

Related U.S. Application Data

(63) Continuation-in-part of application No. 14/260,605, filed on Apr. 24, 2014, now Pat. No. 9,868,653.
(Continued)

(51) Int. Cl.
*C02F 1/36* (2006.01)
*C02F 1/467* (2006.01)
(Continued)

(52) U.S. Cl.
CPC ........ *C02F 1/4672* (2013.01); *B01F 3/04241* (2013.01); *B01F 2003/04886* (2013.01);
(Continued)

(58) Field of Classification Search
CPC .................. C02F 1/4672; C02F 1/4608; C02F 2201/46135; C02F 2201/4615;
(Continued)

(56) References Cited

U.S. PATENT DOCUMENTS

| 1,764,279 A | 6/1930 | Osborn |
| 2,470,118 A | 5/1949 | Trevor, Jr. |

(Continued)

FOREIGN PATENT DOCUMENTS

| CN | 201923870 | 8/2011 |
| DE | 10335880 | 3/2005 |

(Continued)

OTHER PUBLICATIONS

Jayaram, Pulse Power applied to process industry and environment; Proceedings/IEEE GCC conference; Urumchi, Xinjiang, China (2007)..

(Continued)

*Primary Examiner* — Walter D. Griffin
*Assistant Examiner* — Cameron J Allen
(74) *Attorney, Agent, or Firm* — Ross Barnes LLP; Robin L. Barnes; Monty L. Ross

(57) ABSTRACT

A system and method for treating flowing water systems with a plasma discharge to remove or control growth of microbiological species. Components of the water system are protected from being damaged by excess energy from the electrohydraulic treatment. Ozone gas generated by a high voltage generator that powers the plasma discharge is recycled to further treat the water. A gas infusion system may be used to create fine bubbles of ozone, air, or other gases in the water being treated to aid in plasma generation, particularly when the conductivity of the water is high. An electrode mounting assembly maintains a high voltage electrode and ground electrode at a fixed distance from each other to optimize plasma generation. An open support structure for the high voltage generator circuit physically separates spark gap electrodes and resists metal deposits that may disrupt discharge of a high voltage pulse to create the plasma.

22 Claims, 17 Drawing Sheets

Related U.S. Application Data

(60) Provisional application No. 61/983,678, filed on Apr. 24, 2014, provisional application No. 61/983,685, filed on Apr. 24, 2014, provisional application No. 61/818,229, filed on May 1, 2013.

(51) Int. Cl.
*B01F 3/04* (2006.01)
*C02F 103/02* (2006.01)

(52) U.S. Cl.
CPC .............. *B01F 2003/04943* (2013.01); *B01F 2215/0052* (2013.01); *C02F 2103/02* (2013.01); *C02F 2201/46105* (2013.01); *C02F 2303/04* (2013.01)

(58) Field of Classification Search
CPC .... C02F 2201/46175; C02F 1/32; C02F 1/34; C02F 2305/023; C02F 1/487; C02F 1/78; C02F 2103/023; C02F 2303/04; C02F 2303/10; C02F 2303/26; C02F 1/36
See application file for complete search history.

(56) References Cited

U.S. PATENT DOCUMENTS

| | | | |
|---|---|---|---|
| 3,505,533 | A | 4/1970 | Bernstein et al. |
| 3,845,322 | A | 10/1974 | Aslln |
| 4,917,785 | A | 4/1990 | Juvan |
| 5,311,067 | A | 5/1994 | Grothaus et al. |
| 5,464,513 | A | 11/1995 | Goriachev et al. |
| 5,621,255 | A | 4/1997 | Leon et al. |
| 5,630,915 | A | 5/1997 | Greene et al. |
| 5,879,641 | A | 3/1999 | Conrad et al. |
| 5,965,093 | A | 10/1999 | Adams |
| 6,019,031 | A | 2/2000 | Qin et al. |
| 6,060,791 | A | 5/2000 | Goerz et al. |
| 6,145,469 | A | 11/2000 | Teranishi et al. |
| 6,166,459 | A | 12/2000 | Holland et al. |
| 6,228,266 | B1 | 5/2001 | Shim |
| 6,274,053 | B1 | 8/2001 | Conrad |
| 6,325,916 | B1 | 12/2001 | Lambert et al. |
| 6,558,638 | B2 | 5/2003 | Zadiraka et al. |
| 7,209,373 | B2 | 4/2007 | Oicles et al. |
| 7,394,171 | B2 | 7/2008 | Loppacher |
| 7,498,697 | B2 | 3/2009 | Hofmann |
| 9,540,262 | B2 | 1/2017 | Kumagai et al. |
| 2003/0026877 | A1 | 2/2003 | Ruan et al. |
| 2004/0000476 | A1 | 1/2004 | Cho et al. |
| 2006/0049115 | A1 | 3/2006 | Birkbeck |
| 2006/0060464 | A1 | 3/2006 | Chang |
| 2006/0157401 | A1 | 7/2006 | Fuerst |
| 2007/0272621 | A1 | 11/2007 | Dresty |
| 2009/0095352 | A1 | 4/2009 | Kovalcik |
| 2009/0297409 | A1 | 12/2009 | Buchanan et al. |
| 2010/0025240 | A1 | 2/2010 | Muller-Siebert et al. |
| 2010/0072143 | A1 | 3/2010 | Jacobs et al. |
| 2010/0126940 | A1 | 5/2010 | Ryu et al. |
| 2010/0219136 | A1 | 9/2010 | Campbell et al. |
| 2011/0303532 | A1 | 12/2011 | Foret |
| 2012/0160692 | A1 | 6/2012 | Seok et al. |
| 2013/0038970 | A1 | 2/2013 | Hughes |
| 2013/0062314 | A1 | 3/2013 | Curry et al. |
| 2014/0014516 | A1 | 1/2014 | Kumagai et al. |

FOREIGN PATENT DOCUMENTS

| | | | |
|---|---|---|---|
| DE | 102011014329 | 7/2012 | |
| EP | 0750396 | 8/2003 | |
| EP | 1743872 | 1/2007 | |
| EP | 2072471 | 6/2009 | |
| EP | 2363380 | 9/2011 | |
| GB | 1133643 | 4/1966 | |
| JP | 3983282 | 9/1997 | |
| JP | 2000093967 | 4/2000 | |
| JP | 2003062579 | 3/2003 | |
| JP | 2007207540 | 8/2007 | |
| JP | 2009255027 | 11/2009 | |
| JP | 2010523326 | 7/2010 | |
| WO | WO199831636 | 7/1998 | |
| WO | WO-2014171138 A1 * | 10/2014 | ............ C02F 1/4608 |

OTHER PUBLICATIONS

Locke et al., Electrohydraulic Discharge and Nonthermal Plasma for Water Treatment, Ind. Eng. Chem. Res. 2006, 45, 882-905.

Gupta, et al., The Potential of Pulsed Underwater Streamer Discharges as a Disinfection Technique, IEEE Transactions on Plasma Science, vol. 36, No. 4, Aug. 2008, 1621-1632.

Yang, Plasma Discharge in Water and Its Application for Industrial Cooling Wafer Treatment, Thesis, Jun. 2011.

Van Heesch, et al., A Fast Pulsed Power Source Applied to Treatment of Conducting Liquids and Air, IEEE Transactions on Plasma Science, vol. 28, No. 1, Feb. 2000.

Yang, et al., Mineral Fouling Control by Underwater Plasma Discharge in a Heat Exchanger, Journal of Heat Transfer, vol. 133, May 2011.

Yang, et al., Plasma Discharge in Water, Advances in Float Transfer vol. 42, 2010.

* cited by examiner

SYSTEM AND METHOD FOR TREATING WATER SYSTEMS WITH HIGH VOLTAGE DISCHARGE AND OZONE

CROSS-REFERENCE TO RELATED APPLICATIONS

This application claims the benefit of U.S. Provisional Application Ser. Nos. 61/983,678 and 61/983,685, both filed on Apr. 24, 2014. This application is also a continuation-in-part of U.S. application Ser. No. 14/260,605 filed on Apr. 24, 2014, which claims the benefit of U.S. Provisional Application Ser. No. 61/818,229, filed on May 1, 2013.

BACKGROUND OF THE INVENTION

1. Field of the Invention

This invention relates to a system and method for treating flowing water systems using a high voltage discharge to generate plasma and using the ozone by-product from the high voltage generation for enhanced treatment of the water. The system and method of the invention are particularly useful in treating cooling tower or other recirculating or closed-loop systems.

2. Description of Related Art

Anthropogenic water systems are critical components commonly found in most of the world's energy producing facilities, industrial and manufacturing plants, hospitals, and other institutional complexes and buildings. These systems consume around 700 billion gallons of water annually with a cost of $1.8 billion in make-up water and sewage handling costs alone. All of these anthropogenic water systems require some form of treatment, either chemical or non-chemical, to control the build-up of scale, biofilm and other corrosion by-products on the important heat transfer surfaces that are necessary for efficient system operation.

For water systems involving heat exchange, such as cooling towers and boilers, effective treatment to remove these contaminants and to prolong the amount of time before the systems are re-contaminated can save significant amounts of money. An effective and thorough treatment may save costs for labor and treatment chemicals by reducing the frequency of periodic treatments or reducing the amount of chemicals needed for routine maintenance and/or periodic treatments. Such a treatment may also save on energy costs through the operation of clean heat exchange surfaces. Fouling of heat exchange surfaces costs U.S. industry hundreds of millions of dollars every year and is directly related to an increase in energy consumption of almost 3 quadrillion Btus (quads) annually.

To maximize the water usage and minimize waste, many of these systems employ a series of chemical treatments that protect the system against scaling, biofilm formation, and corrosion. These chemical treatments allow the water to be reused and recycled a number of times before it becomes necessary to discharge the water and replace it with fresh water. Increasing the duration for which the water may be circulated significantly reduces the amount of water that is discharged to the sewage system and minimizes the amount of make-up water that is needed to replace the bleed off. However, many chemical treatment compositions and methods may damage the components of the water system being treated as the chemicals used are highly corrosive. There is also an environmental down side to harsh chemical treatments, including growing concern over the formation of toxic disinfection-by-products such as trihalomethanes, haloacetonitriles, and halophenols that have been identified in the discharge water being released into the environment. It is estimated that there are 536 billion pounds of water treatment chemicals discharged annually as a result of cooling tower treatments, which may impact a variety of species living in or near areas and water-ways receiving the discharge or bacterial components of sewage treatment plants receiving the discharge.

In an attempt to minimize the environmental impact associated with some chemical treatments, many water treatment companies, and more importantly their customers, are looking to use non-chemical based water treatment technologies to maintain the performance of their systems. There are currently about 30 non-chemical treatment devices or water conditioning technologies that are commercially available for use in both commercial and residential water systems. These systems can be divided into three categories: (1) Indirect chemical producers that use a benign or safe chemical additive such as air or salt to produce the biocide. These systems include ozone generators and electrochemical hypochlorite generators and mixed oxidant generators. (2) Direct chemical producers that generate the active chemical species from direct interaction on the water. These devices use mechanical processes, such as hydrodynamic cavitation or sonic cavitation, to produce hydroxyl radicals along with localized areas of high temperatures and pressures in the water. Other types of devices that would fit into this category are ultraviolet light systems. (3) Electrical and Magnetic devices, including plasma generation, use induced electrical and magnetic fields to induce ion migration and movement that can result in cell death through electroporation, or on cyclotron resonance effects within the cell wall. Out of all of these technologies the electrical and magnetic devices are the most common; however, they are the technologies that have the least rigorous scientific support. The direct and indirect chemical approaches have more scientific credibility; however, this greater understanding may have limited their potential applications and hence they have not been able to capture a larger portion of the market share.

The application of high voltage discharge and generating plasma within water is known in the prior art. For example, an article published by B. R. Locke et al. (Ind Eng. Chem Res 2006, 45,882-905) describes electrode configuration and geometry, the pulsed arc vs. pulsed corona, and the chemical species that are formed during an electrohydraulic discharge and non-thermal plasma in water discharge process. The article addresses many of the fundamental issues related to using this technique for water treatment, but it fails to address the practical applications related to water treatment in an industrial, commercial, or residential environment, especially related to the need for multiple ground points to minimize the effect of the electromagnetic radiation released into the water and surrounding atmosphere.

In a more recent publication Bruggeman et. al published an extensive review on non-thermal plasmas in and in contact with liquids in which he outlined 14 different reactor configurations that included many of the electrode geometries outlined in the article by Locke. (P. Bruggeman, and C. Leys, J. Phys. D. Appl. Phys, 2009, 1-28). In most of these reactor types the fluid being treated by the plasma discharge is a bulk discharge system with no flow (such as a bubble corona discharge reactor, discharge reactor with submerged liquid jet, electrolysis discharge reactor or capillary needle discharge reactor system); however, there is also a description of a dielectric barrier discharge (DBD)

reactor where a fluid and air stream are introduced on either side of the of the barrier in a bubble discharge reactor. The article notes that even when the bubbles were not in contact with the electrodes there was a possibility of generating plasma within the bubbles, and that the sparking voltage of the system decreases with increased bubble rate. There is no mention of the effect of bubble size on the spark voltage. Indeed it was also noted that bubbles when situated along the surface of an insulator resulted in streamers that were shaped and situated along the bubble surface and that the discharge is always generated at the triple junction between the electrode, the bubble wall, and the insulator.

It is also know to use ozone gas to treat water. For example, in an article by Gupta et al. (S. B. Gupta, IEEE Transactions on Plasma Science, 2008, 36, 40, 1612-163) the use of an advanced oxidation process resulting from pulsed discharges in water is described. The process described by Gupta uses oxygen gas or ozone gas supplied into the discharge reactor from secondary independent sources (and not from the high voltage generator). They also report that system output and performance is highly dependent on solution conductivity. For systems where water conductivity can be high, such as in cooling tower and closed loop applications, higher voltage discharges are needed and this in turn creates problems with increased electromagnetic radiation.

In order to generate plasma or produce an electrohydraulic discharge between a high voltage electrode and a ground electrode in water, especially in a water system where the water chemistry (conductivity, chemical composition, dissolved solids, planktonic bacterial counts, pH etc.), can change over time requires a high voltage power supply that can generate up to and above over 200 kV potential difference between the two electrodes. One known system for generating voltages sufficient to generate plasma or produce an electrohydraulic discharge in water is a Marx generator or a Marx ladder. A Marx generator uses a circuit that generates a high voltage pulse by changing a set of capacitors in parallel then using a spark gap trigger to suddenly discharge the capacitors in series. Typically, the components are supported by a frame within a housing containing a pressurized gas. Many of these high voltage generators are designed with maximum energy density as the ultimate goal and are designed as such using gasses like $SF_6$ and increased pressure in the spark gap chamber to facilitate higher breakdown voltages. As a result of these high breakdown voltages, every time the spark gap is activated there is some metallic loss as a portion of the spark gap electrode is vaporized. The vaporized metal may then be deposited on components of the high voltage generator and after some accumulation may disrupt the timing of the spark gap discharge. This is not a problem for high voltage systems that are being run for short periods of time, such as for use with static water treatment operations; but, for a system that is designed to run for months to years at a time, such as for treatment of flowing water systems, this is highly problematic.

There are several prior art patents or published patent applications that address plasma generation for various purposes, including water treatment or purification, such as U.S. Patent Application Pub No. 2009/0297409 (generation of flow discharge plasmas at either atmospheric or higher pressures), U.S. Patent Application Pub No. 2006/0060464 (generation of plasma in fluids, in particular formed within the bubbles generated and contained in an aqueous medium and describing multiple electrode configurations, including a configuration to trap the bubbles and have them act as a dielectric barrier to increase the voltage across the electrodes), U.S. Pat. No. 6,558,638 (using high voltage discharge to treat liquids, while incorporating a gas delivery means for generating bubbles in the discharge zone), and U.S. Patent Application Pub No. 2010/0219136 (pulsed plasma discharge to treat fluid such as water at a flow rate of 5 gpm while consuming only 120-150 Watts of power).

There are also numerous patents disclosing Marx generator designs. For example, U.S. Pat. No. 3,505,533 discloses a Marx generator coupled with a Blumlein transmission line (a voltage doubling line). The spark gaps of the Marx are in an enclosed housing filled with a pressurized inert gas (CO2 and Argon) and the entire device is submersed in oil. U.S. Pat. No. 7,498,697 discloses a Marx generator with a conductive plastic connection structure that is mounted to an insulating layer for mechanical retention. The conductive plastic replaces coupling and charging resistors and will have long term resistance to high voltages.

The known prior art discloses systems and methods for generating high voltage discharges to generate plasma to create chemically active species, exhibit physical effects, and control water chemistry. However, the known prior art does not address the how to apply this technology of using plasma discharge to treat larger volumes of flowing water in an industrial, commercial or residential setting over longer periods of time without damaging other components of the water system, including the controllers and monitors that are needed for scale and corrosion control, blowdown, and water conservation measures. Additionally, the known prior art does not address use of this technology in re-circulating water systems having variable conductivity over time. Finally, the known prior art does not disclose the capture and use of ozone generated by a Marx generated as an additional water treatment.

SUMMARY OF THE INVENTION

This invention relates to a treatment system and method using non-chemical technologies to treat flowing water systems, such as cooling towers and closed-loop or recirculating water systems. This treatment system and method involves generating a high frequency and high voltage discharge between two electrodes submerged in the water being treated. With each discharge between the electrodes there is a number of long lived oxidative chemicals (ozone, hydrogen peroxide) and short lived oxidative chemicals (super oxides, hydroxyl radicals, and hydrogen radicals) generated, UV radiation is also generated, together with sonic shockwaves. These effects are well known in the prior art and have been used for periodic treatment of static water systems, but have not previously been used to effectively treat flowing or re-circulating water systems. According to one preferred embodiment of the invention, a treatment system and method for producing high voltage to generate plasma to treat water in a flowing or re-circulating water system are provided. The treatment system and method effectively provide a substantially continuous treatment for water flowing through a reaction chamber in which plasma is repeatedly generated at predetermined time intervals over prolonged periods of operation, without damaging components of the water system.

According to one preferred embodiment, a treatment system and method utilize a plasma reaction chamber or reactor unit that enables a long term plasma or electrohydraulic discharge to occur in flowing water that can have changing conductivity, temperature and dissolved solids. One preferred embodiment of a reactor unit according to the invention comprises a body that is capped on both ends with fittings that allow water and optionally gasses to be introduced and removed from the reactor body, and for electrical connections to be made with the high voltage and ground electrodes. According to another preferred embodiment, a reactor unit comprises an electrode mount assembly disposed within the reactor unit. An electrode mount assembly preferably comprises a configuration that reduced choke points with the reactor or plasma discharge zone and that funnels gas bubbles into the plasma discharge zone to aid in plasma generation when the conductivity of the water increases.

According to another preferred embodiment of the treatment system and method of the invention, ozone gas produced as a by-product of high voltage generation is captured and used to enhance the water treatment. In order to maximize the reaction area for the high voltage discharges in highly conductive water found in flowing and re-circulating water systems, power supplies with the capability of generating over 200 kV are preferred. A by-product in the operation of these power supplies is the production of ozone gas that should be removed or it may damage components of the high voltage generator system, such as the support structure. In this embodiment, that ozone is captured and introduced into the water being treated, preferably in a plasma reaction chamber, to enhance the water treatment.

According to yet another preferred embodiment, a gas infusing system is provided to introduce the ozone by-product or other gases, such as air or reactive gases, into the water being treated to further enhance the treatment. These gases are preferably added to the water prior to entering a reaction chamber where plasma generation occurs or are generated in-situ within a reaction chamber. Preferred embodiments of a gas infusing system include a microbubbler, a venturi input or venturi injector, hydrodynamic cavitation system, sonicating probes, or a combination thereof. A gas infusing system preferably introduces a fine dispersion of bubbles into the water being treated, which further aids in plasma generation because the dielectric breakdown strength of air/gas is less than that of water. As the plasma breakdown is initiated in air or gas molecules, ionized electrons from the air or gas molecules will then carryover and begin electron ionization in the water molecules.

According to another preferred embodiment of a treatment system and method according to the invention, a continuous duty high voltage generator is provided. A preferred high voltage generator has a Marx generator or Marx ladder configuration. A known problem with prior art Marx generators is that metal from the spark gap electrodes becomes deposited on the sides of the wall of the Marx ladder closed support structure and other components of the high voltage generator system disrupting the timing of the spark gap discharge, which would prevent or interfere with the formation of plasma. A preferred embodiment of a Marx generator support structure according to the invention comprises an open frame of increased height and width to increase the distance between the spark gap electrodes. With the increased spacing between the spark gap electrodes, metal deposits do not bridge the gap as quickly as with a narrower support enclosure. According to another preferred embodiment of a Marx generator support structure, a bottom connecting portion of the frame is submerged in an oil bath to electrically isolate it from a capacitor bank. Another preferred embodiment comprises a support structure that is coated with a mineral oil to prevent or inhibit metal deposits from forming on the surfaces of the support structure surface and to allow easy removal of any deposit that do form on the surfaces. According to another preferred embodiment, a support structure is made from ozone resistant materials, as ozone is known to weaken some materials which can result in mechanical failure of the support structure. According to another preferred embodiment, a housing or cover is placed over the Marx generator support structure to capture ozone for use in enhanced water treatment and to facilitate operation of the Marx generator at reduced or negative pressure.

According to another preferred embodiment of the invention, a system and method for treating water includes one or more control systems connected to one or more components. According to a preferred embodiment, a control system times a pulsed high voltage discharge to occur at specific time increments or intervals to prevent over heating of the water, wiring, or other critical power supply components of the treatment system and water system. According to yet another embodiment, a control system comprises a feedback loop that records the water conductivity, which increases with cycles of re-circulation, as water flows through the water system and treatment system. As the conductivity increases, the controller increases the flow of air or other gases (such a through a gas infusing system) into a reaction chamber to aid in plasma discharge.

According to another preferred embodiment of the invention, various protective devices, such as isolated power supply, grounded metal components, and electromagnetic interference devices, are used throughout the treatment system and/or water system to protect the components of the water system from excess voltage produced. According to another preferred embodiment, excess energy produced by the high voltage discharge (which is normally wasted) is captured to further condition and treat the water. Current is allowed to flow through wire loops connecting water system piping to a ground to generate a magnetic field in the water. This magnetic field has been shown to have a beneficial effect in water treatment and avoids the damaging effects of the large amounts of electromagnetic radiation throughout the entire water system have on the electronic control systems used to measure conductivity, pH, biological activity, as well as to control pumps and other critical system components that are typically found with systems that directly generate a high voltage discharge into a water supply. The use of a high voltage discharge without having multiple ground points or other protective device in the water or adequate shielding around the high voltage components severely limits the applicability of the existing prior art.

Treatment systems and methods according to the invention effectively remove biofilm and algae along with other deposits from the water in the water system without requiring the use of harsh chemicals and without damaging components of the water system. The treatment systems and methods of the invention are also more effective than prior art treatments since substantial deposits and algae were observed being released from water systems treated according to the invention even when the water flowing through the water system was considered to be clean (based on prior chemical treatment or because it primarily consisted of new water from a municipal supply). When the treatments according to the invention are used, increased copper corrosion rates are also observed, which indicates that the heat exchanger tubes are being effectively cleaned of biofilm growth and other deposits resulting in increased heat exchange efficiency.

BRIEF DESCRIPTION OF THE DRAWINGS

The apparatus of the invention is further described and explained in relation to the following drawings wherein.

DESCRIPTION OF THE PREFERRED EMBODIMENTS

Figure 1:
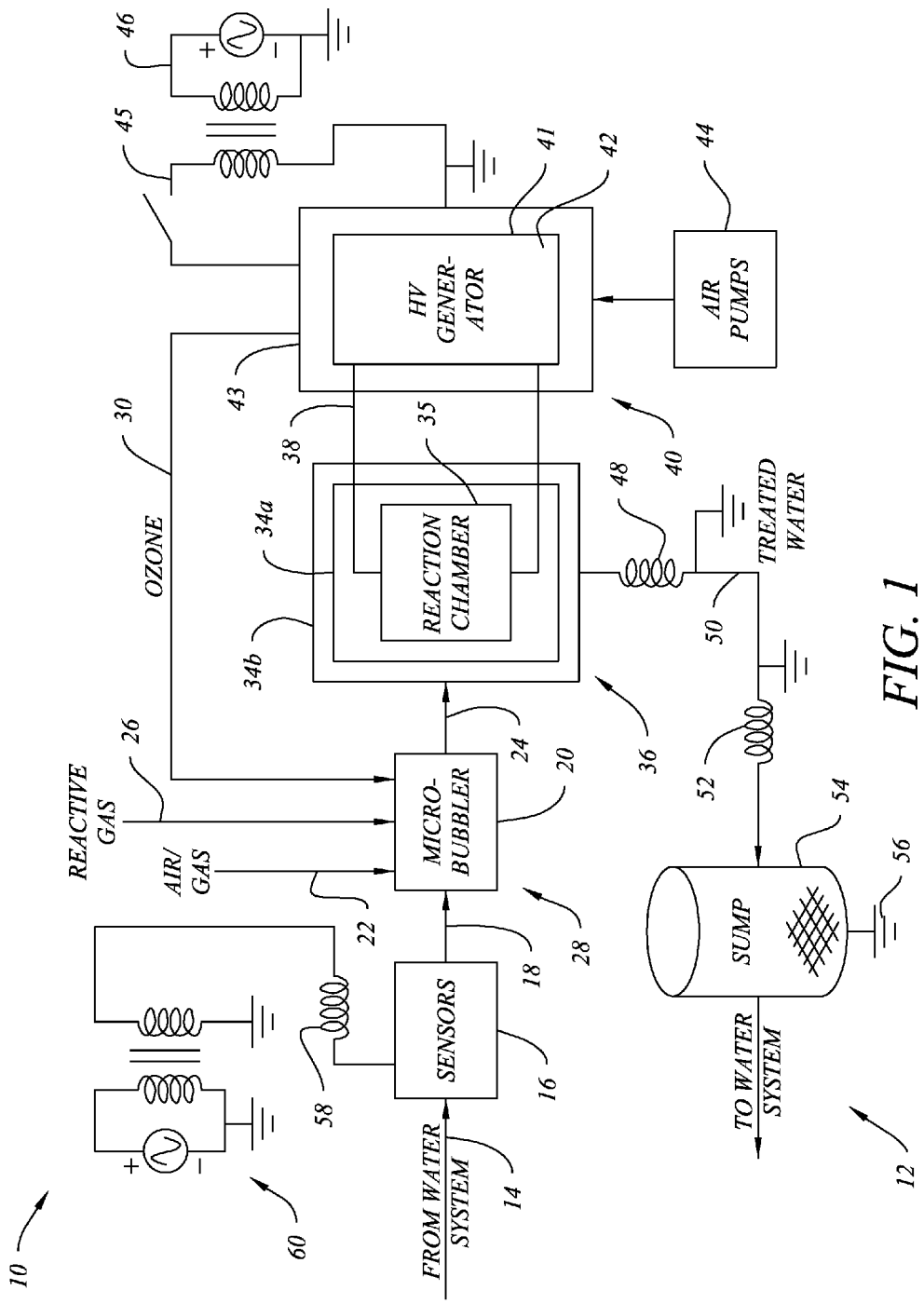
FIG. 1 is a schematic view of one preferred embodiment of a system according to the invention.

A preferred embodiment of a treatment system according to the invention is depicted in FIG. 1. Treatment system 10 preferably comprises a gas infusing system 28, a plasma reaction chamber 36, a high voltage generator system 40, power system 46, and various component protection devices. Treatment system 10 is easily added to an existing water system 12. Water system 12 can be any residential, commercial or industrial water system, particularly those used for cooling applications and recirculated water systems, such as cooling towers. Water system 12 includes well known components that are not depicted in FIG. 1. A water stream 14 from the water system 12 being treated passes through various sensors 16 commonly used in monitoring water systems, such as pH sensors, temperature, and conductivity. Depending on the size of the water system 12 and volume of water flowing through the water system 12, all of the water in the system may pass through the treatment system 10 or only a portion or side stream may pass through treatment system 10. Most preferably, treatment system 10 comprises a shut-off valve or diverter to bypass the treatment system, such as when the treatment system is shut-down for maintenance, without having to also shut-down or reduce flow of water through the water system Water stream 18 preferably flows through gas infusing system 28, which infuses water stream 18 with fine bubbles of air and/or gas. Preferably, gas infusing system 28 comprises one or more micro-bubbler devices 20, where air or gas 22, reactive gas 26, and/or ozone 30 are introduced into the water stream as fine bubbles upstream of plasma reaction chamber 36. Reactive gases, such as ozone, mono-atomic oxygen, meta-stable singlet delta oxygen, vapor phase hydrogen dioxide, chlorine gas, chlorine dioxide gas, may also be used to achieve maximum removal of microbiological species from water system 12. The use and selection of such gases will depend on water conditions within water system 12. It is not required to add air, ozone, or other gas streams to water stream 18, or that such be added as micro-bubbles, but the micro-bubbles aid in plasma generation and the ozone gas or reactive gas also serve to treat the water of the water system. If bubbles are added, stream 24, infused with bubbles feeds plasma reaction chamber 36, otherwise stream 18 feeds plasma reaction chamber 36.

In another preferred embodiment gas infusing system 28 comprises a venturi system for infusing a fine bubble dispersion of air/gas, reactive gas, and/or ozone into water stream 18 to produce water stream 24. The venturi input is located upstream of the high voltage reaction chamber 36 and introduces micro-bubbles of one or more of these gases into the high voltage discharge area within the reaction chamber 36. In another preferred embodiment the micro-bubbles are generated by incorporating a hydrodynamic cavitation system that introduces a highly dispersed suspension of micro-bubbles produce by the hydrodynamic cavitation process into a reaction zone within reaction chamber 36. In a fourth preferred embodiment, a venturi system and hydrodynamic cavitation system are used together. The combination has the advantage of generating a synergistic environment for optimized reaction kinetics and active species generation. In a fifth preferred embodiment, the high voltage reaction chamber 36 could be coupled with a plurality of sonicating probes that could generate micro-bubbles in situ within a high voltage discharge zone within chamber 36, again providing synergistic reaction performance. Finally in a sixth preferred embodiment, one or more of these gases could be venturied into the high voltage reaction zone together with the micro-bubbles being generated by the sonicating probes. The introduction of micro-bubbles using any of these systems or devices or any combination of these systems and devices, the components and applications of which are well known in the art, further aid in plasma generation because the dielectric breakdown strength of air or gas is less than that of water. As the plasma breakdown is initiated in the air or other gas molecules, ionized electrons from the air or other gas will then carryover and begin electron ionization in the water molecules.

According to another preferred embodiment, one or more components of a gas infusing system 28 are connected to a controller (which may be a controller for the water system or a separate controller for the treatment system). The controller operates to increase the flow of air or other gases into reaction chamber 36 in response to increased measurements of conductivity in the water (which is typically measured as part of the water system control functionality). The increased air flow aids in ensuring that a plasma discharge occurs even when the conductivity of the water is high.

Figure 6:
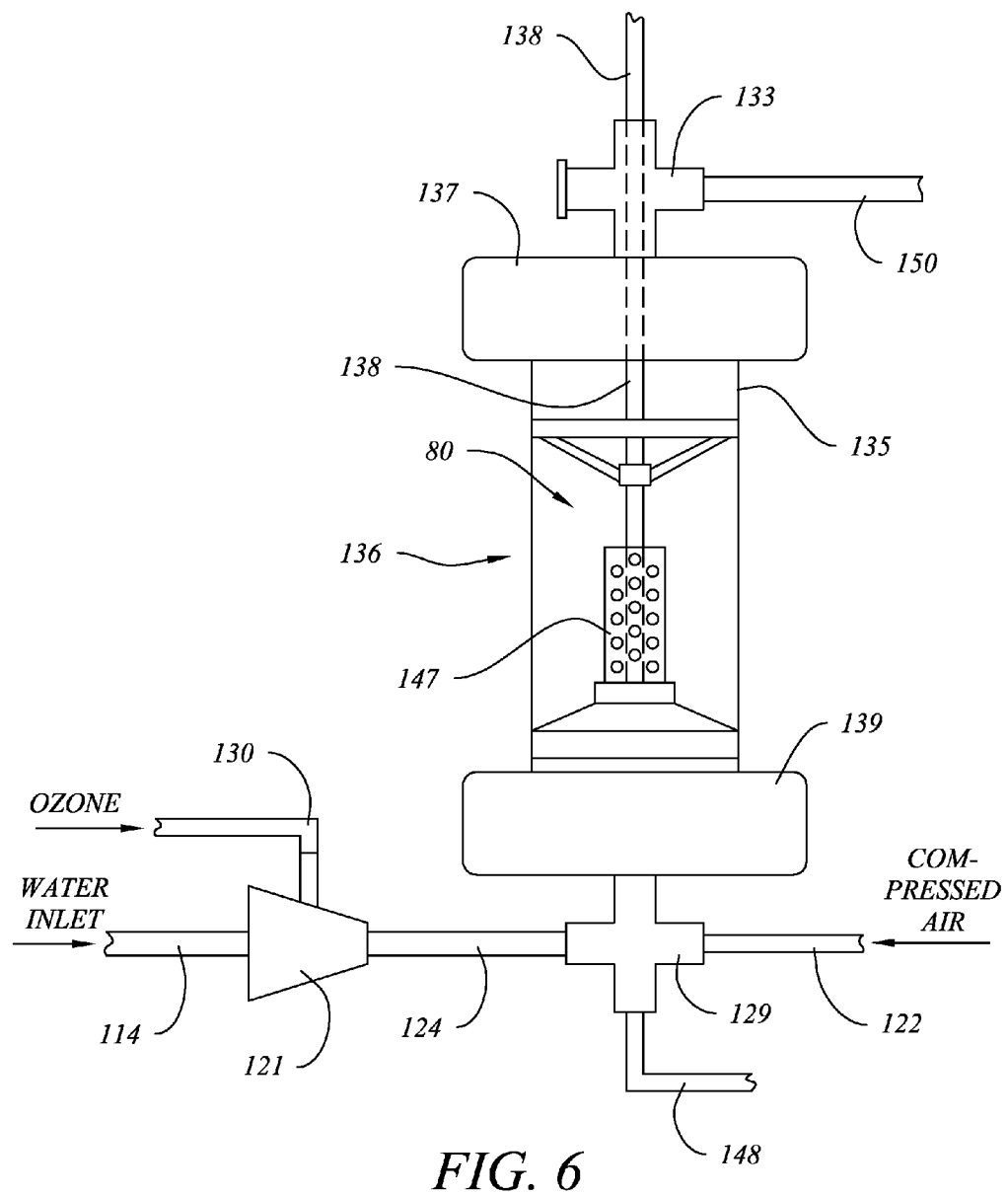
FIG. 6 is a front elevation view of a preferred embodiment of a reaction chamber and electrode mount assembly according to the invention.
Figure 7:
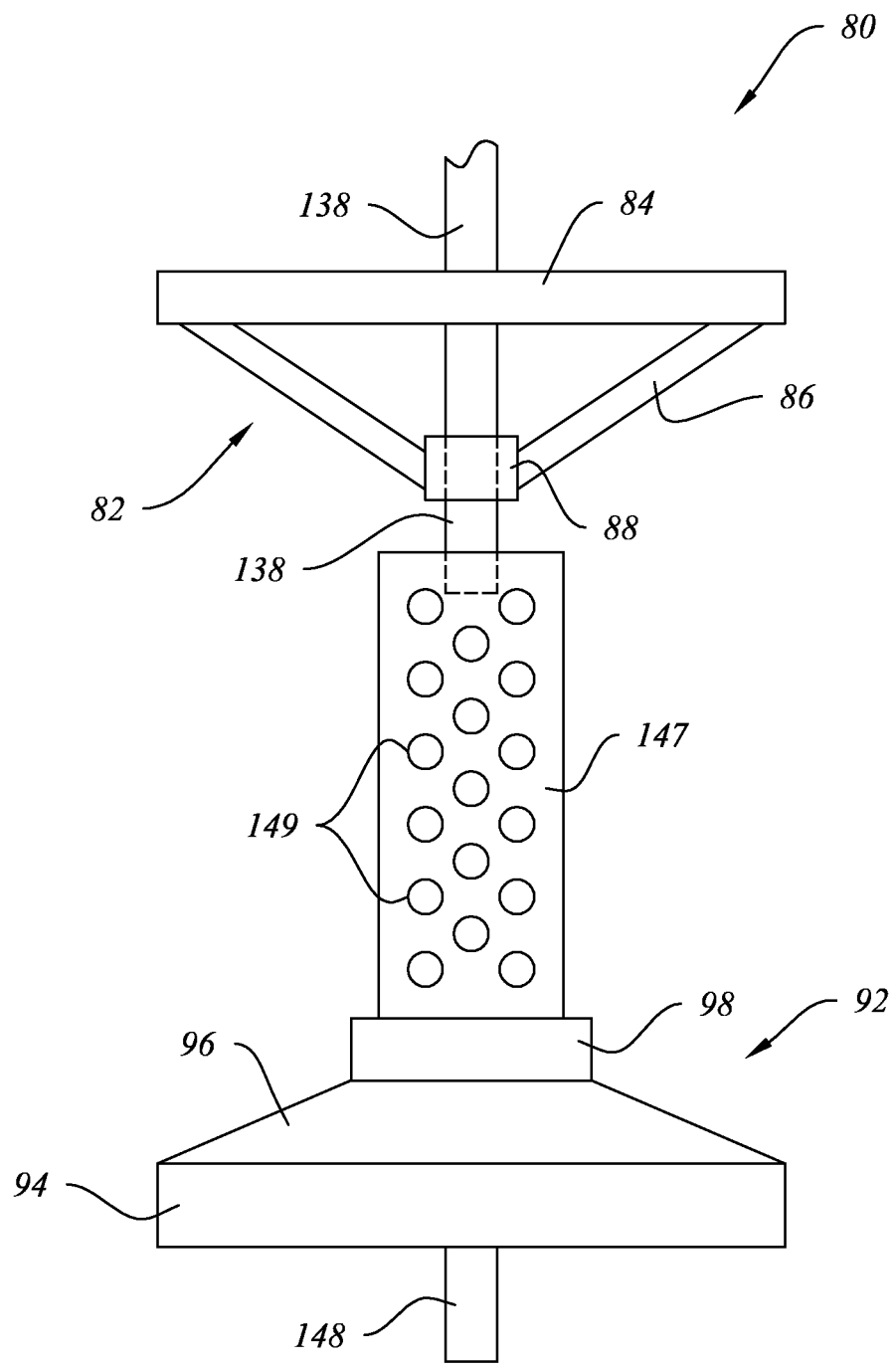
FIG. 7 is a front elevation of an alternate preferred embodiment of the electrode mount assembly and ground electrode of FIG. 6.

Reaction chamber 36 preferably comprises a sealed, water-tight housing 35 surrounded and shielded by an inner dielectric barrier layer 34a and outer ground shield 34b. The dielectric barrier 34a is a non-conductive layer that prevents arcing to the ground layer 34b, which is a conductive outer layer tied to the ground. The dielectric barrier 34a and ground shield 34b reduce electromagnetic interferences radiating from the reaction chamber 36. If reaction chamber 36 is not shielded, sensitive electronic equipment may be damaged by the plasma generated within the chamber 36. Within reaction chamber 36 are disposed a high voltage electrode and a ground electrode which generate a plasma discharge within chamber 36 as voltage generated in high voltage generator system 40 is transmitted to the high voltage electrode within chamber 36. These components for generating a plasma discharge are well known to those of ordinary skill in the art. The shape and configuration of reaction chamber 36, housing 35, and the high voltage and ground electrodes within reaction chamber 36 are not critical and any known shape and configuration may be used, although a preferred embodiment of an electrode mount assembly and reaction chamber as shown in FIGS. 6-7 and discussed below is most preferably used. Another ground 48 is also disposed in contact with ground layer 34b surrounding housing 35, which is needed to generate the plasma discharge in reaction chamber 36. Ground 48 may act as a ground electrode or may be connected to a thicker rod or other conductor to act as the ground electrode. A highly insulated high voltage wire 38 connects the high voltage generator system 40 with the high voltage electrode in reaction chamber 36. Wire 38 is preferably insulated with a high strength dielectric to prevent arcing to other electronic devices, metal structures, or people/operators. Wire 38 may act as the high voltage electrode or may be connected to a thicker rod or other conductor to act as the electrode. Treated water stream 50 exits the reaction chamber 36 and returns to sump 54 (particularly where water system 12 is a cooling tower) or other components or piping of water system 12 to be recirculated through the system. Inlet and outlet couplings for water streams 24 and 50 into and out of chamber 36 should be grounded.

High voltage generator system 40 may generate a high frequency, high voltage pulse that exceeds 200 kV on each discharge step. The high voltage generator system 40 preferably comprises a Marx ladder or Marx generator 42 disposed within a spark gap chamber 41 within an outer housing 43 (such as in the preferred embodiment shown in FIG. 19) that includes a dielectric barrier to isolate the Marx ladder 42 from the surrounding environment and prevent arcing from the internal components to nearby metal structures, electrical outlets, and other monitoring and control systems. To be effective in treating conductive waters similar to those seen in traditional cooling towers or closed loop systems, the high voltage generator system 40 is preferably capable of a voltage output of 200 kV for an electrode gap of around 5 mm between the high voltage discharge electrode and the ground electrode in the reaction chamber 36. Although other gap distances may be used with modifications that would be understood by one of ordinary skill in the art, a gap distance of around 5 mm is preferred. This is preferred because a larger gap distance requires an increase in output voltage, which can introduce additional issues, such as component failure in the high voltage generator system 40, and a smaller gap distance reduces the volume of water being exposed to the plasma discharge.

Figure 19:
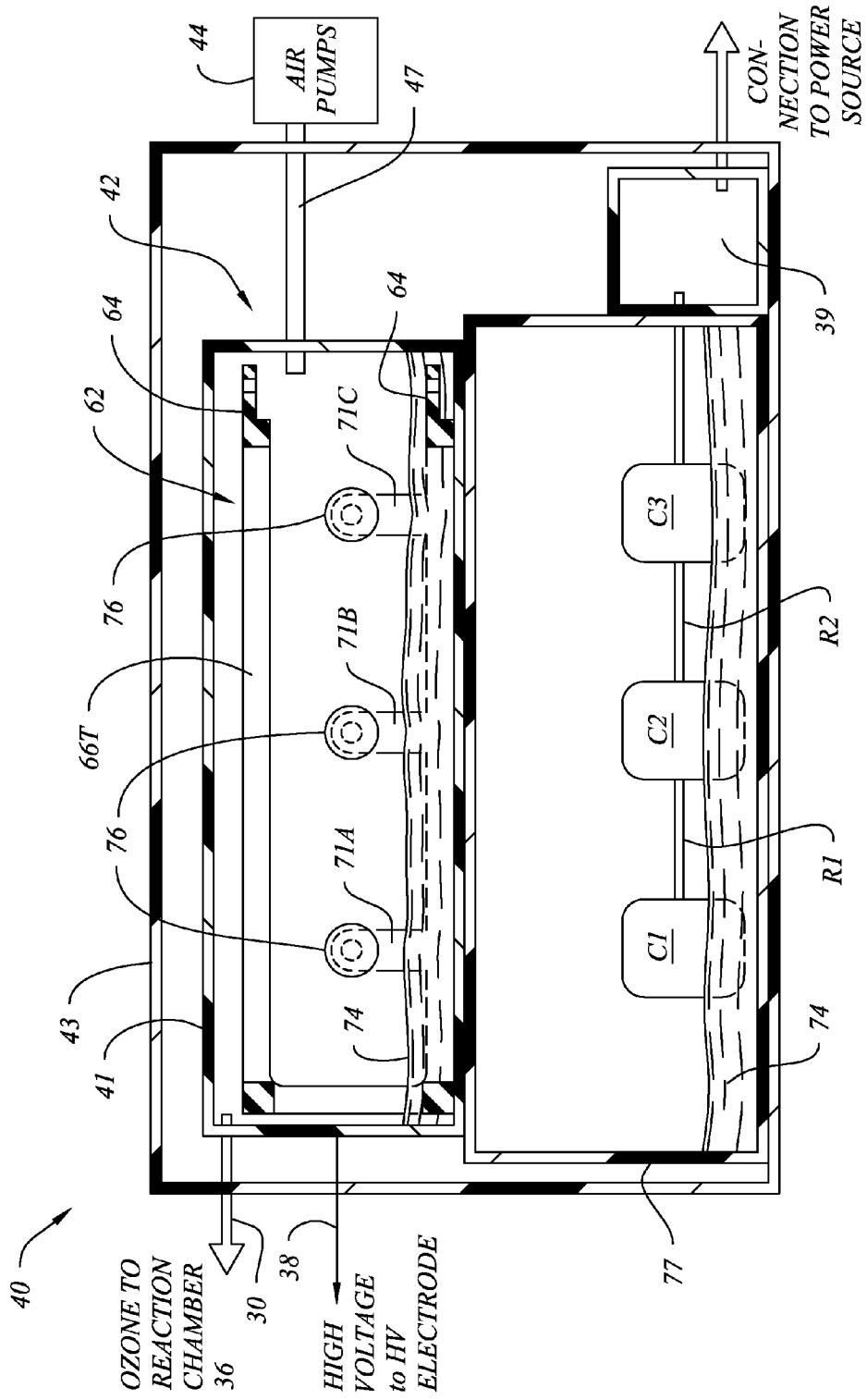
FIG. 19 is a cross sectional, front elevation view of a preferred embodiment of a high voltage generator system, showing an outer housing, spark gap chamber, and Marx ladder support structure.
Figure 22:
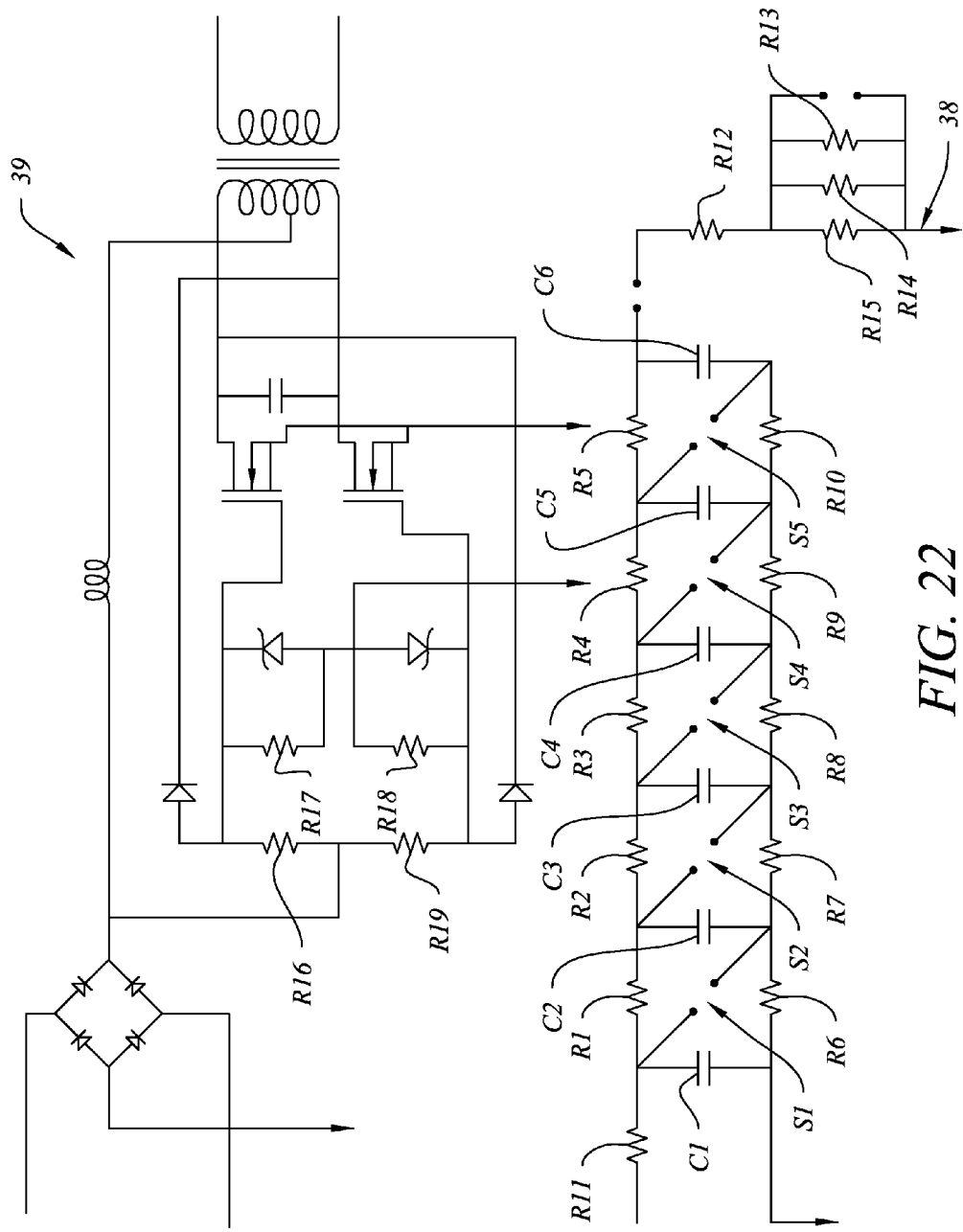
FIG. 22 is a circuit layout for the Marx ladder of FIG. 15.

In one preferred embodiment, the high voltage generator system 40 comprises a stage 1 low voltage component (driver circuit 39, as shown in FIGS. 19 and 22) that takes the 110V output from a typical wall outlet and generates a 40 kV DC signal. This is achieved by a Zero Volt switching circuit that pulses the input from a flyback transformer. The number of turns on the transformer can be increased or decreased to change the output voltage of the flyback transformer. An advantage of using a Zero Volt Switching driver circuit is that it features a high noise immunity, that is not susceptible to electromagnetic interference that is created in pulsed power systems. Digital or other circuits can also be used, but they are more sensitive to outside interference generated by the plasma reaction chamber 36 than a Zero Volt Switching driver. To protect the electronics from the high voltage output this is constructed as a separated shielded entity. The signal from the stage 1 low voltage component (driver circuit 39) is used to charge a capacitor bank in the Marx generator 42, which has the capacitors assembled in parallel. When the capacitor bank reaches the discharge limit, it triggers a cascading discharge event between spark gaps in a Marx ladder so as the terminal voltage is greater than 200 kV between the discharge and ground electrode.

Air pumps 44 or other devices to pressurize or blow air are preferably integrated into high voltage generator system 40, but may also be external to generator 40 and connected with appropriate conduit to permit air flow into generator 40. Air pumps 44 blow air through the high voltage generator system 40 to quench the electrodes of the Marx ladder 42, which aids in increasing electrode lifetime. Air pumps 44 flush air across the electrodes and out of the spark gap chamber 41. Ozone gas 30 generated from the spark gap chamber 41 is withdrawn from high voltage generator system 40 and preferably recycled back to be injected or infused into water stream 18 to provide further water treatment Ozone gas generated from the Marx ladder is typically considered a waste product, but it is beneficially used according to the invention as a source of water treatment. Most preferably, the ozone gas 30 is venturied into water stream 18 at or near an inlet into reaction chamber 36. This permits the introduction of ozone (and other components of air, such as nitrogen) into the water supply and also aerates the water stream 18 with fine micro-bubbles to form feed stream 24. The use of the ozone by-product from the high voltage generator system 40 combined with plasma discharge has been found to be synergistic and particularly effective in reducing planktonic bacteria in the water being treated.

Treatment system 10 also comprises a power system 46 and various protective devices to protect the components of the water system from excess voltage produced. Power system 46 preferably comprises an uninterruptable power supply or isolation transformer, which reduces any transient voltage spikes from entering the power supply of the building in which water system 12 is housed. This also isolates the high voltage generator system 40 from other electronic components of the building and the water system 12, such as sensors 16 which have a separate, uninterruptable power supply or isolation transformer 60. A grounded metal component 56 is preferably placed in a water reservoir for the water system 12 (such as sump 54 in the case of a cooling tower). Grounded metal component 56 is preferably a piece of metal or mesh with a large surface area, but other shapes and configurations may be used. This grounded component reduces or eliminates electromagnetic interference through the water. Electromagnetic interference suppressors 58 are preferably connected to or clamped on electronic components of water system 12, particularly any sensors (such as sensors 16) that will be used to monitor water qualities—such as conductivity, temperature, and pH. Other grounding devices, such as 52, may be added as necessary to other reservoirs or piping within water system 12 or connecting water system 12 with treatment system 10. In one preferred embodiment, grounding device 52 comprises a screw inserted into a wall of a pipe through which water in the water system is flowing, with a length of wire connected at one end to the head of the screw and wrapped around the pipe several times, with the other end connected to ground. Other grounding devices or configurations may also be used as will be understood by those of ordinary skill in the art. Typically, these grounding devices will be placed on or near specific types of equipment, such as a corrater (corrosion monitoring system), chemical controller, flow controller, conductivity probe, or will be spaced out throughout the water system with 2-4 devices used in most large water system applications. These grounding devices serve to protect the components of water system 12 and also allow the energy from the multiple ground points to be harvested and stored in a capacitor or inductor. The harvested and stored energy may be used to generate low level energetic fields (electromagnetic or electrochemical) that provide further benefits to the water treatment process. Electromagnetic fields have been used to prevent chemical scale formation and have been used to induce electroporation and ion cyclotron resonance, which have been shown to have antimicrobial properties. Electrochemical reactions can generate areas of localized high and low pH and can induce electroporation as well. They may also generate low level electromagnetic fields locally within the water system without storing the energy. For example, with a wrapped wire device around a pipe in the water system as described above, each time a pulse (from the plasma) is sinked to ground, a current will flow through the wire loops around the pipe to generate a magnetic field in the water flowing through the pipe at that location.

Treatment system 10 also preferably comprises a controller or a timer in order to activate the treatment system 10 at periodic intervals. A controller or timer would periodically turn on various components, including power system 46 to charge the high voltage generator system 40, air pumps 44, and components of gas infusion system 28, such as microbubbler 20. Once high voltage is discharged from high voltage generator system 40 to reaction chamber 36 and a plasma discharge is generated within reactor housing 35, the components of the treatment system would be shut-off until it is time for the next cycle. This activation/deactivation cycle repeats at periodic intervals, preferably around 15 minute intervals, over the course of a substantially continuous treatment cycle lasting several weeks to several months during normal operations of the water system and treatment system. Periodic activation/deactivation reduces overall system heating and increases efficiency. As the system heats up, more energy will be dissipated in the Marx generator 40, which results in more charging losses and less energy being available for plasma generation within reactor housing 35. Allowing the system to cool during periodic deactivation reduces charging losses and increases efficiency. Periodic activation/deactivation will also allow the ozone from the spark gap chamber to be flushed out on a regular basis (and preferably fed into reactor housing to enhance the water treatment) and maintain a pulsed arc discharge over the greater than 5 mm electrode gap between the high voltage electrode and ground electrode in the reactor housing. In order to operate the system safely it is preferred to power the system through a switch box 45 that features a ground fault circuit interrupt. This emergency stop system will trigger if the current flowing from the device does not match the current sinking into the device.

The following are examples wherein a treatment system 10 according to various embodiments of the invention was tested.

Example 1A. Direct Discharge into an Unprotected System

In the first set of experiments, a pilot cooling tower was used. Components of this experimental system that correspond with the systems depicted in FIG. 1 are labeled according to the reference numbers in FIG. 1. A cooling tower (total volume 100 L) water system 12 was charged with water and the system was set to circulate. The water chemistry was monitored using an Advantage Control system and biological monitoring as performed using two in-house biological monitoring systems and a ChemTrak biological monitor. These systems are typically found or are similar to those typically found in larger scale commercial or industrial cooling tower operations. To incorporate the high voltage generator system into the cooling tower, a side-stream flow (stream 18) was pulled from the heat exchanger rack via a mechanical ball valve and 12 feet of 0.75 inch diameter clear flexible PVC tubing. This valve allows the system to change flow dynamics based on the specific composition of the water being treated. For example, changing the flow rate past the venturi changes how the gas bubbles are distributed into the water and this in turn can change the form of the plasma generated at the high voltage discharge electrode. Also volume and flow rate are important in terms of treatment of the entire system water for biological control using directed high voltage discharge because successful treatment depends not only on the amount of energy being delivered, but also the treatment time. Since bacteria are constantly replicating in a typical system within a large volume of water, it is important to achieve a high enough flow rate through the reaction chamber 36 in order to ensure that the entire volume of system water is repeatedly treated or cycled through the high voltage discharge zone to increase total treatment time (the total amount of time a column of water with biological constituents in contact with the high voltage discharge).

Figure 2A:
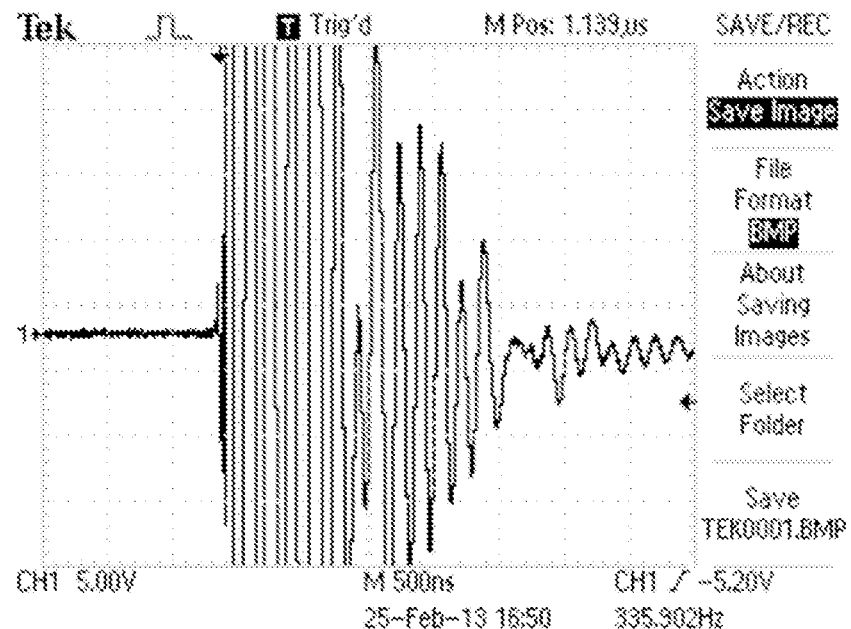
FIGS. 2A and 2B are graphs showing electromagnetic fields measured in one experiment when an embodiment of the invention was not applied.
Figure 2B:
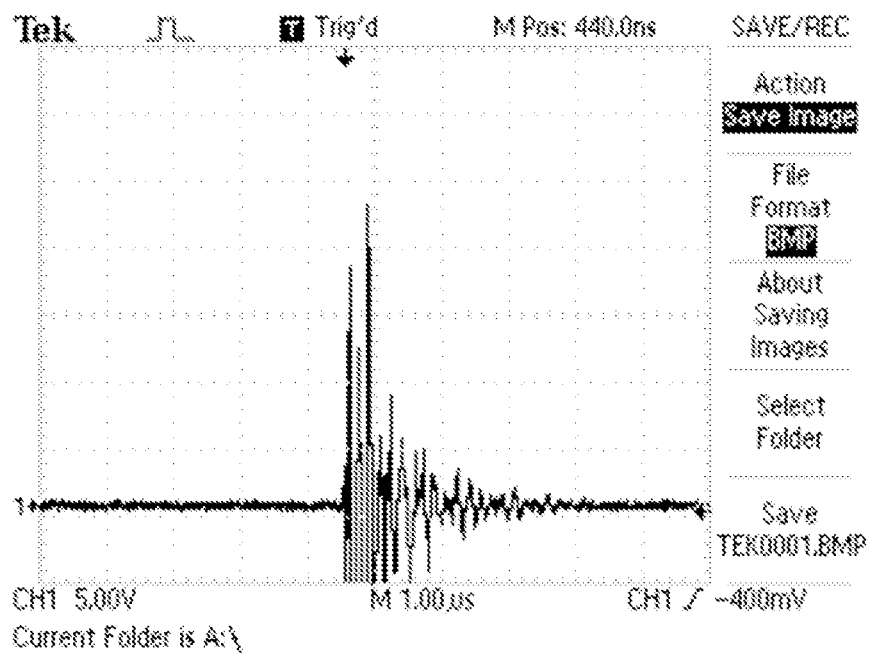

Using this setup on the pilot cooling towers allows for a maximum of 2 gpm side-stream flow. This tubing was connected to a plasma chamber 36 via a threaded polyethylene barbed fitting. At the outlet of the reaction chamber, 5 feet of clear PVC tubing is used to drain the water exiting the reaction chamber (stream 50) into the sump 54. None of the grounding points (such as ground 52 and 56) described with respect to a preferred embodiment above was put in place. The reaction chamber 36 was connected to a high voltage generator system 40. The unit was activated and a pulsed spark discharge in water with 1,500 pmhos conductivity was observed over a 1 cm electrode gap. Immediately upon activating the high voltage generator system 40, flow control relays of water system 12 began to activate off and on, cutting off power to the water system 12. The electronics in the Advantage Controller over loaded and shut the system down and the biomonitor output (located on the other side of the room from the high voltage generator system 40) overloaded and shut off. FIGS. 2A and 2B show the electromagnetic fields measured in the water with the plasma unit on in this test embodiment, with water flow and no water flow with the electromagnetic fields traveling through the water in both cases. It can be seen that when the water is flowing (FIG. 2A) there is a high resonance electromagnetic pulse penetrating the water circulating through the system. It can be seen that even when the water is not flowing (FIG. 2B) there was still a measurable electromagnetic field resulting from the high voltage discharge.

Example 1B. Direct Discharge into a Protected System

Figure 3:
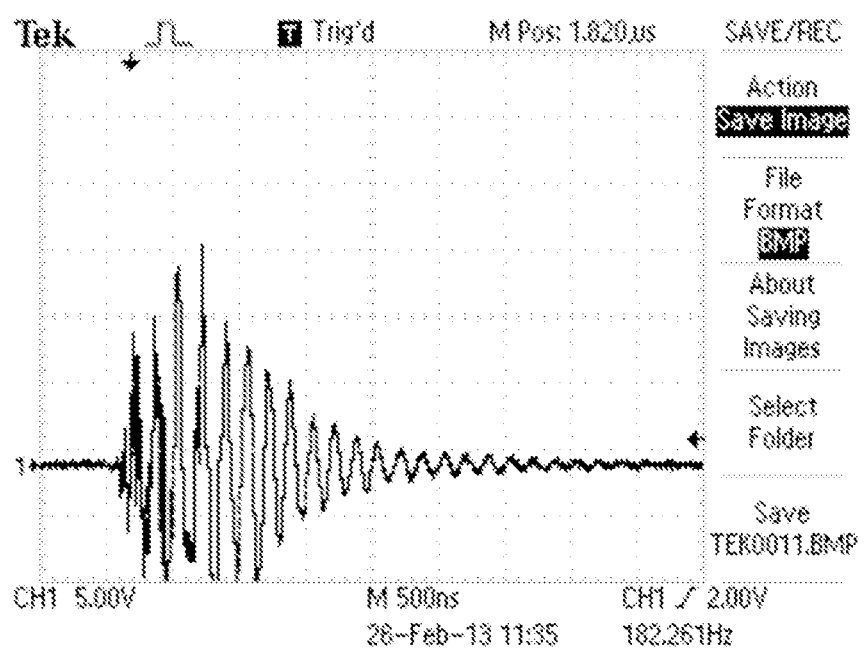
FIG. 3 is a graph showing electromagnetic fields measured in another experiment using a preferred embodiment of the invention.

The experiment of 1A was repeated, but with a multiple ground protective system in place. Grounds were placed in a sump 54 and parts of the tubing (using a screw and wire wrapping as discussed above) throughout system. FIG. 3 shows that there is a significant reduction in the electromagnetic field in the water. Using the multiple ground system, it is now possible to run the high voltage discharge system for several hours continuously without causing problems to the electronic control and monitoring equipment used as part of the water system 12.

Example 2. Bench Trials for Removal of Microorganisms

Four bench-level studies were conducted to determine the efficacy of a non-thermal plasma discharge in water to inactivate microorganisms. It is known that a plasma discharge in water will generate active oxygen species, UV radiation, and pressure field shock waves all of which can inactivate microorganisms. A plasma discharge can be achieved by increasing the electric field in a solution beyond its breakdown voltage. The breakdown voltage is dependent on the conductivity and the dielectric properties of the solution. It has been observed that a relationship exists between the input energy and the log reduction of the microorganisms in the system. It has also been documented that the input energy needed to achieve a one log reduction (known as D-value) in *E. coli* can vary from 14 J/L to greater than 366 J/L. As for experiments with certain species of *pseudomonas*, it has been reported that 85 kJ/L is the average input energy needed to achieve one log reduction.

In a first experimental set, a rod to cylinder electrode configuration was placed in a beaker containing 1,600 mL of water (800 mL of tap water and 800 mL of distilled water). Ozone generated from a Marx generator (from the non-thermal plasma's voltage multiplier) was aerated into a secondary beaker containing 1,600 mL of water (also 800 mL of tap water and 800 mL of distilled water) (beaker #2). For these tests, *Escherichia coil* (*E. coli*) was utilized because of its high susceptibility to inactivation by directed energy methods. For each of the beakers containing 1,600 mL of the described water, 2 mL of a TSB stock solution with a known concentration of suspended *E. coli* was used to inoculate each of the water filled beakers for a final *E. coli* concentration of $4.65 \times 10^6$ cfu/mL (Test #1) and $4.50 \times 10$ cfu/mL. For the plasma only beaker test (beaker #1), the cylinder electrode diameter was increased from a ⅝ inch (which generated an arc discharge) to a 1 inch size so that a pulsed corona was generated during the discharge. A purpose of this test was to determine which of an arc discharge (which puts more energy into the system, which is preferred) or a pulsed corona results in the most biological inactivation.

As for the ozone treatment only beaker, ozone was pushed through a Marx generator chamber and bubbled into the beaker with the use of an airstone. During the experiments, 25 mL samples were collected Independently from each beaker at 0 min., 2 min., 4 min., 10 min., 20 min., and 30 min. and bioassayed for cfu/mL determination. The results of the pulsed corona discharge plasma only test are shown in Table 1 below under Test #1.

A second experiment combined the aerated ozone and a rod to cylinder electrode setup into a single beaker containing 1,600 mL of water (800 mL of tap water and 800 mL of distilled water) (Test #2). For this test, 2 mL of a TSB stock solution with a known concentration of suspended *E. coli* was used to inoculate the water filled beaker for a final *E. coli* concentration of $6.10 \times 10^6$ cfu/mL. The cylinder electrode diameter ¼ inch so that a pulsed spark (pulsed arc discharge) would be generated in the solution during discharge and the ozone generated by a Marx generator was bubbled into the beaker beneath the electrode setup. During the experiment, 25 mL samples were collected at 0 min., 10 min., 30 min., 45 min., and 60 min. and bioassayed for cfu/mL determination. The results are shown in Table 1 below under Test #2.

A third experiment featured a rod to cylinder electrode configuration placed in a beaker containing 1,600 mL of water (800 mL of tap water and 800 mL of distilled water) (Test #3). Ozone generated from a Marx generator (from the non-thermal plasma's voltage multiplier) was aerated into a secondary beaker containing 1,600 mL of water (again 800 mL of tap water and 800 mL of distilled water). For this study, *Escherichia coli* (*E. coli*) was utilized because of its high susceptibility to inactivation by directed energy methods. For each of the beakers containing 1,600 mL of the described water, 2 mL of a TSB stock solution with a known concentration of suspended *E. coli* was used to inoculate each of the water filled beakers for a final *E. coli* concentration of $3.05 \times 10^6$ cfu/mL and $3.40 \times 10^6$ cfu/mL respectively. Similar to the second experiment, the cylinder electrode diameter was lowered so that a pulsed spark (pulsed arc discharge) would be generated in the solution during discharge. As for the ozone treatment only beaker, ozone was pushed through the Marx generator chamber and bubbled into the beaker with the use of an airstone. During the experiment, 25 mL samples were collected independently from each beaker at 0 min., 10 min., 15 min., 30 min., and 45 min. and bioassayed for cfu/mL determination. The results are shown in Table 1 under Test #3.

In a fourth experiment, the aerated ozone was combined with and a rod to cylinder electrode setup into a single beaker containing 2,000 mL of water (1,000 mL of tap water and 1,000 mL of distilled water) (Test #4). For this test, 5 mL of a TSB stock solution with a known concentration of suspended *Pseudomonas putida* was used to inoculate the water filled beaker for a final Pseudo. *putida* concentration of $7.00 \times 10^7$ cfu/mL. Different from the first experiment, the cylinder electrode diameter was lowered so that a pulsed spark (pulsed arc discharge) would be generated in the solution during discharge and the ozone generated by a Marx generator was bubbled into the beaker beneath the electrode setup. During the experiment, 25 mL samples were collected at 0 min., 15 min., 30 min., 45 min., and 60 min. and bioassayed for cfu/mL determination. The results are shown in Tables 1 and 2.

TABLE 1

Summary of Plasma Effectiveness Studies (Bench-Level Testing)

| Test 1 (*E. coli*) Plasma Only Study Pulsed Corona Discharge in a beaker with no Ozone | | Test 2 (*E. coli*) Plasma + Ozone Study Pulsed Spark (Pulsed Arc) Discharge plus Ozone Treatment | | Test 3 (*E. coli*) Plasma Only Study Pulsed Spark (Pulsed Arc) Discharge in a beaker with no Ozone | | Test 4 (*Pseudo. putida*) Plasma + Ozone Study Pulsed Spark (Pulsed Arc) Discharge plus Ozone Treatment | |
|---|---|---|---|---|---|---|---|
| Sample 0 min. (Control) 6.67 log (cfu/mL) | Log Reduction | Sample 0 min. (Control) 6.79 log (cfu/mL) | Log Reduction | Sample 0 min. (Control) 6.48 log (cfu/mL) | Log Reduction | Sample 0 min. (Control) 7.00 log (cfu/mL) | Log Reduction |
| 2 min. | 0.15 | 10 min. | 1.28 | 10 min. | 2.74 | 15 min | 0.72 |
| 4 min. | 0.23 | 30 min. | 5.79 | 15 min. | 3.82 | 30 min. | 1.46 |
| 10 min. | 0.40 | 45 min. | 5.14 | 30 min. | 4.20 | 45 min. | 1.55 |
| 30 min. | 0.99 | 60 min. | ≥6.79 | 45 min. | 4.46 | 60 min. | 1.85 |

TABLE 2

Summary of Plasma Effectiveness Studies (Bench-Level Testing)

| Sample | CFU/ml | $Log_{10}$ Density |
|---|---|---|
| (Plasma ONLY) Study Using *E. coli* as Target Organism | | |
| Control | 3.05.E+06 | 6.48 |
| 10 min Post Treatment | 5.45.E+03 | 3.74 |
| 15 min Post Treatment | 4.60.E+02 | 2.66 |
| 30 min Post Treatment | 1.90.E+02 | 2.28 |
| 45 min Post Treatment | 1.05.E+02 | 2.02 |
| Plasma + Ozone Study Using *E. coli* as Target Organism | | |
| Control | 6.10.E+06 | 6.79 |
| 10 min Post Treatment | 3.25.E+05 | 5.51 |
| 30 min Post Treatment | 1.00.E+01 | 1.00 |
| 45 min Post Treatment | 4.50.E+01 | 1.65 |
| 60 min Post Treatment | Below LOD | Below LOD |
| (Ozone ONLY) Study Using *E. coli* as Target Organism | | |
| Control | 3.40.E+06 | 6.53 |
| 10 min Post Treatment | 6.60.E+05 | 5.82 |
| 15 min Post Treatment | 6.35.E+05 | 5.80 |
| 30 min Post Treatment | 1.23.E+05 | 5.09 |
| 45 min Post Treatment | 1.17.E+05 | 5.07 |
| Plasma + Ozone Study Using *Pseudo. putida* as Target Organism | | |
| Control | 1.01.E+07 | 7.00 |
| 15 min Post Treatment | 1.92.E+06 | 6.28 |
| 30 min Post Treatment | 3.45.E+05 | 5.54 |
| 45 min Post Treatment | 2.85.E+05 | 5.45 |
| 60 min Post Treatment | 1.43.E+05 | 5.15 |

Figure 4:
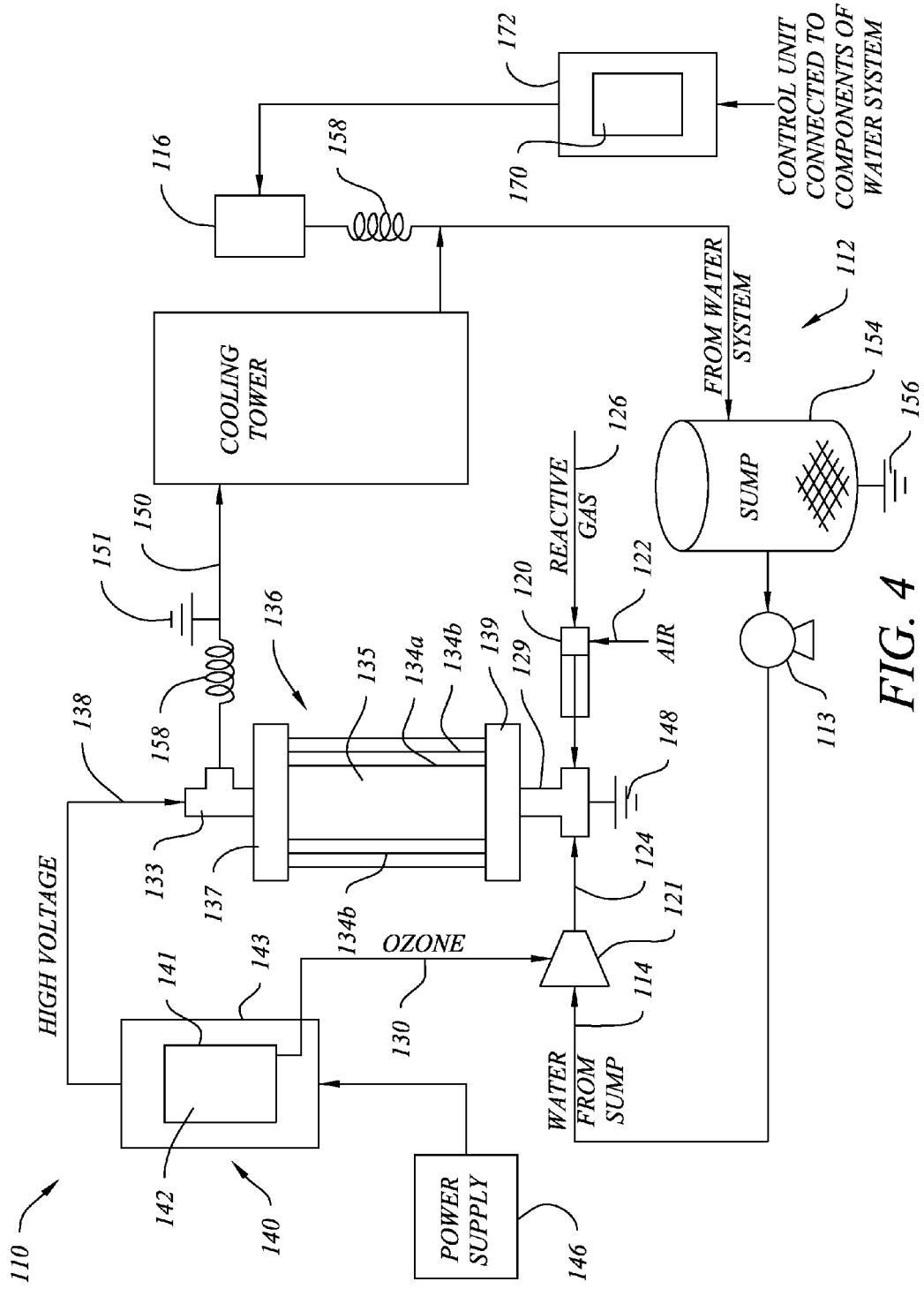
FIG. 4 is a schematic view of another preferred embodiment of a system according to the invention.

Referring to FIG. 4, a field test was also performed using a preferred embodiment of the system and method of the invention. The goal for this field test was to install a plasma water treatment system 110 in a cooling tower water system 112 that used oxidizing biocides to control the microbial population in the water. The cooling tower water system 112 had a total volume of 1,400 gallons and was situated at street level outside the administrative building of a local University. A control unit 115 that monitored water flow and water conductivity was used to control the water system blow down and chemical feed into the sump 154. This unit maintained water conductivity between 900 pmhos and 1500 pmhos. The plasma treatment system 110 comprises a high voltage generator 140 and a plasma reaction chamber 136. High voltage generator comprises a Marx ladder or Marx generator 142 disposed within a spark gap chamber 141 within an outer housing 143 that includes a dielectric barrier. Ozone gas stream 130 is withdrawn from spark gap chamber 141 and is injected into inlet water stream 114 via a venturi 121. Although not used initially in this test, air 122 and/or reactive gas 126 could also be injected into the water stream through a micro-bubbler or similar device 120. A tee, mixer, or similar connecting device 129 may be used to infuse stream 124 (containing ozone) with micro-bubbles of air and/or reactive gas from micro-bubbler 120 and provide an inlet into reaction chamber 136. Reaction chamber 136 comprises a sealed, water-tight housing 135 surrounded and shielded by an inner dielectric barrier layer 134a and outer ground shield 134b. The dielectric barrier 134a is a non-conductive layer that prevents arcing to the ground layer 134b, which is a conductive outer layer tied to the ground. Within reaction chamber 136 are disposed a high voltage electrode and a ground electrode which generate a plasma discharge within chamber 136 as voltage generated in high voltage generator 140 is transmitted to the high voltage electrode within chamber 136 via wire 138. Wire 138 may act as the high voltage electrode or may be connected to a thicker rid or other conductor to act as the electrode. Another ground 148 is also disposed in contact with ground layer 134b surrounding housing 135. Ground 148 may act as the ground electrode or may be connected to a thicker rod or other conductor to act as the electrode. Reaction chamber 136 in this field test was around 4 inches in diameter. The reaction chamber 136 in this field test was plumbed directly into the existing water lines of water system 112. The reactor inlet 129 was connected to the water line 114 from the high pressure side of the pump 113 which was removing the water from the cooling tower sump 154. A venturi 121 inserted into the line between the pump 113 and the reactor 136 was used to draw ozone gas 130 generated by the Marx ladder 142 into the water being treated. The treated water 150 exiting the reaction chamber 136 was returned to the output side of the chiller where it circulated back into the cooling tower.

When the system 110 was installed initially, none of the recommended precautions or protective measures mentioned in reference to FIG. 1 and treatment system 10 were in place. The system 110 was installed in close proximity to the water system master control system, it was not grounded, there was no shielding of the controller unit and there were no ferrite beads around the sensors leads for EMI suppression. The high voltage generator 140 was plugged directly into main electrical outlet in the wall.

To start the process, water stream 114 was introduced into the reaction chamber 136 and the high voltage system 140 was activated. Immediately the electromagnetic feedback through the water caused the conductivity meter on the water system 112 to jump to 6000 μmhos, forcing the water system 112 into an immediate blow down mode that resulted in water being dumped to the drain. Without one or more of the protective measures referenced with system 10 of FIG. 1, it would be impossible to effectively operate a high voltage discharge treatment system in a cooling water system.

The set-up of systems 110 and 112 were then reconfigured with the water control unit 170 (used to control various components of the water system 112) being isolated within a housing 172 and by clamping ferrite beads 158 around the wires leading to the conductivity sensor 116. Housing 172 encloses water system control unit 170 during operation of system 110, but comprises an openable door or a removable cover so that the interior may be accessed for service. Housing 172 is preferably a metal box, but other shielding materials such as plastics, concrete or metal plastic composites may also be used. The high voltage generator 140 was moved to the opposite side of the room from the controller (approximately 12 feet away, and preferably at least 6 feet away) and the power supply 146 was switched from directly connected to the mains to being run through a UPS. The sump 154 in the cooling tower was grounded 156, as was the return (treated) water line 150 grounded by 151. Optionally, ferrite beads 153 may also be wrapped around treated water line 150. When the system 110 was activated there was no negative impact on the control system 170 or sensor 116, allowing the cooling tower system 112 to operate normally.

Using this set up, the water treatment system 110 was run for 6 months without the addition of biocide. During the process, ozone gas 130 generated in the Marx ladder 142 was introduced into the water entering the reaction chamber 136. This produced a fine stream of bubbles at the high voltage electrode surface. When the water had a low conductivity around 900 pmhos this would be sufficient to generate a plasma discharge, but as the conductivity increased with increasing number of cycles of concentration, this was no longer adequate to generate a plasma discharge in the reaction chamber. As the water conductivity increases, parasitic electrochemical reactions become the favored mechanism for the discharge of the electrons, and the ability to generate a plasma is diminished. Additional air 122 was introduced into the reaction chamber that provided a more robust air curtain between the ground electrode and the high voltage discharge electrode allowing plasma to be generated in water with conductivity in excess of 1500 pmhos. Once the conductivity reaches a pre-set threshold, usually around 1500 pmhos, the cooling tower or other water system goes into blow down mode, dumping the high conductivity water to the drain and replacing it with new water (usually fresh water from a municipal supply, but other water sources with lower conductivity levels may be used).

Figure 5:
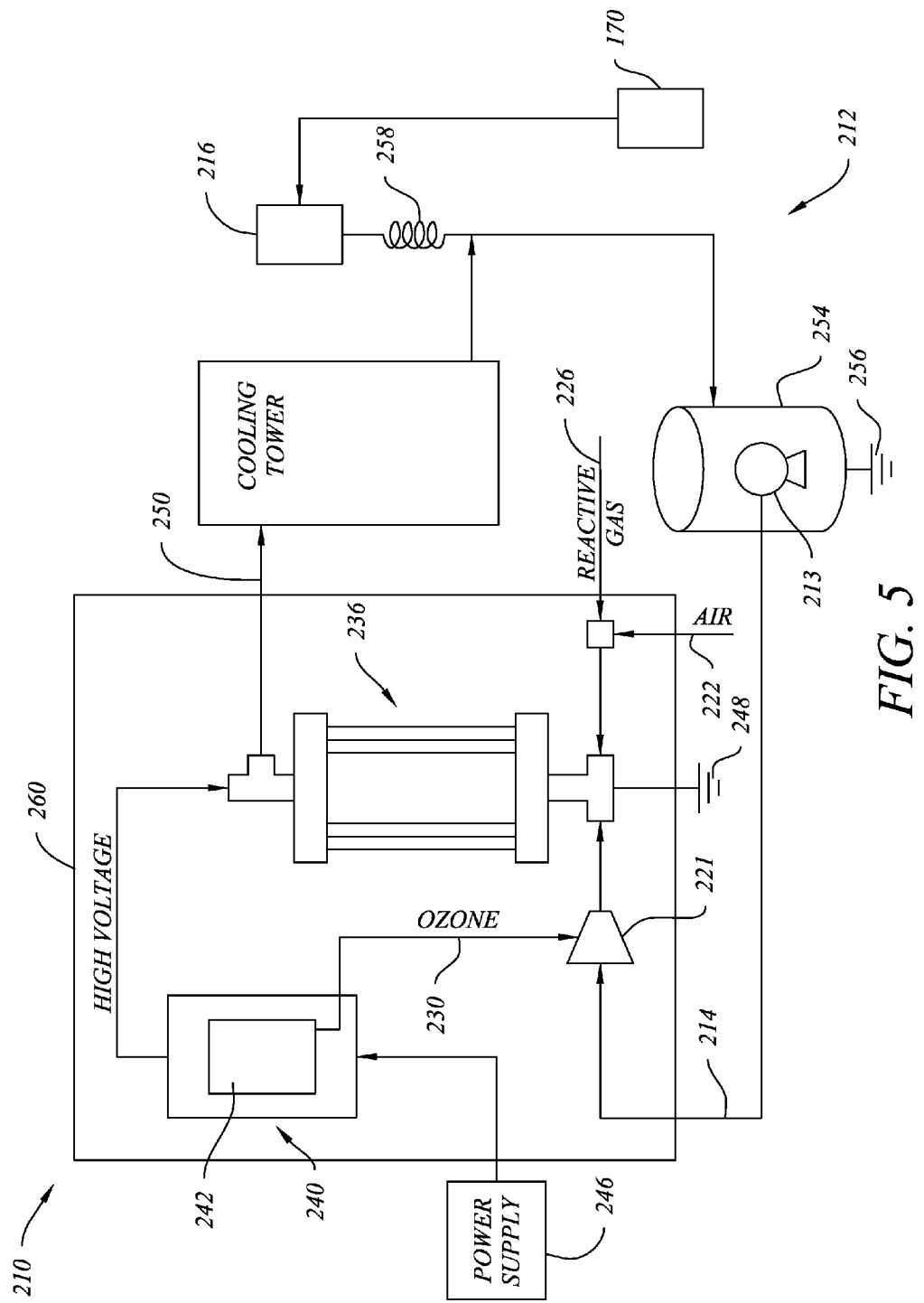
FIG. 5 is a schematic view of another preferred embodiment of a system according to the invention.

Referring to FIG. 5, another preferred embodiment of plasma treatment system 210 was tested in a second field trial. System 210 was Installed to treat a 2,200 gallon stainless steel/galvanized cooing tower water system 212. During this installation, the high voltage generator 240 and the plasma reactor chamber 236 were shielded within a housing 260 and placed on the outside wall away from the water control unit 270 and sensors 216 of water system 212. Housing 260 is preferably at least 6 feet away from water control unit 270 and sensors 216. Housing 260 is preferably made of metal, but other materials such as plastic or metal plastic composites may also be used. Housing 260 encloses system 210 during operation, but comprises an openable door or a removable cover so that the interior may be accessed for service. When housing 260 is used, it is not necessary to enclose control unit 170 in a housing (such as housing 172 used with system 110), but such a housing may also be used for added protection of the control unit. The water 214 from the sump 254 was circulated through the plasma reactor using a pump 213 that was placed directly in to the sump 254 which was grounded 256. The high voltage generator 240 was connected directly to the main electrical outlet as power supply 246, but the outlet was on its own breaker circuit. With this set-up, system 210 was able to continuously operate for 6 months (at which time the cooling system was shut-down for winter, but it is believed the system could have continued operating with this embodiment of the invention for a longer period if cooling was needed) without any electrical or EMI issues interfering with operation of water system 212.

Any combination of protective measures, such as a grounded piece of metal or mesh with a large surface area placed within a sump (similar to 56), electromagnetic interference suppressors (such as 58), grounded wire wrapped pipe segments or ferrite beads (such as 52 or 158 or 258), a protective housing (such as 260) around the high voltage generator and plasma reaction chamber, a protective housing around the water control unit (such as 172), locating the high voltage supply and reaction chamber a sufficient distance from the water control unit and sensors, segregated power supply for the high voltage generator (such as an outlet on its own breaker circuit or a UPS or isolation transformer), and/or segregated power supply for the water control unit or sensors (such as a separate UPS or isolation transformer) may be used with any treatment system according to the invention to protect the water system components from any interference or damage and to permit the treatment system to operate continuously for extended periods of time. Any combination of grounding devices may also be used with any treatment system according to the invention to harvest (and to store using capacitors or inductors) excess energy generated by the treatment system and to generate low level energetic fields (electromagnetic or electrochemical) that provide further benefits to the water treatment process.

The ability to control pressure drop across a reactor housing within which a plasma discharge will occur, is important for ensuring sufficient discharge, especially if ozone, air or other gas is being added to the inlet water stream to supplement the dielectric barrier of the high voltage discharge electrode. Paschen's Law is an equation that describes the break down voltage necessary to start a discharge between two electrodes as a function of pressure and gap length (distance between the high voltage electrode and ground electrode). In the initiation of a plasma discharge, the first ionization energy of an electron must be reached to dislodge and liberate an electron that when accelerated results in chain reaction electron avalanche as the liberated electrons collide with the atoms. The higher the pressure of the discharge medium the more collisions that occur as the electron travels from the discharge electrode to the ground, and this randomizes the electron direction, which in turn can result in electron deceleration resulting in a failed discharge between the electrodes. Because water can be viewed as a highly condensed gas, pressure drop across the electrode becomes a major contributing factor to the ability to successfully produce an electrohydraulic discharge within reactor housing.

Additionally, as flow velocity through the reactor housing increases, choke points can develop in certain areas of flow through the reactor housing and these choke points cause pressure increases that impact the pressure drop across reactor housing. In order to successfully discharge plasma in reactor housing, it is preferred to minimize these potential choke points. As such, it is preferred that the treatment systems according to the invention (such as system 10, 110, or 210) be configured so that treated water stream on the outlet end of reactor housing has the highest flow coefficient possible, according to the following equation:

$$C_v = F\sqrt{\frac{SG}{\Delta P}}$$

where $C_v$=Flow coefficient or flow capacity rating of valve. (volume of water of flow in gpm)
F=Rate of flow (US gallons per minute)
SG=Specific gravity of fluid (Water=1)
$\Delta P$=Pressure drop across body (psi).

There are several factors that can be manipulated either individually or together, that will optimize the pressure drop across the body and the flow rate of the fluid through the reactor. Lowering the flow rate is not desirable, as that lowers the flow coefficient and it is preferred that the flow coefficient on the discharge end be as high as possible. Lowering the flow rate also minimizes contact time and decreases efficiency, which are not desirable. Additionally, it is preferred to minimize the pressure drop across reactor housing 135 to increase the flow coefficient. In experiments conducted using treatment systems according to the invention, it was determined that minimizing the pressure on the discharge end of reaction chamber aids in the formation of plasma by lowering the breakdown voltage. In high conductivity water, such as the water frequently encountered in re-circulating water system, lowering the breakdown voltage results in less parasitic current losses (V=iR) and therefore more energy will be input into the water being treated via plasma.

In addition to minimizing the pressure on the discharge end, diminished plasma generation associated with increased conductivity in the water being treated may also be addressed by (1) moving the high voltage electrode and the ground electrode closer together (but this has the drawback of reducing the volume of water being exposed to the plasma discharge), (2) increasing the voltage between the ground and high voltage electrode (but this has the drawback of possible component failure in the high voltage generator), or (3) increasing the gas phase dielectric barrier around the high voltage electrode. The treatment systems and methods according to the invention most preferably rely on increasing the gas phase dielectric barrier through the use of a gas infusion system to add bubbles to the water being treated as the most favorable way to aid in plasma generation in high conductivity water.

Referring to FIGS. 6-7, a preferred embodiment of a reaction chamber 136 and electrode mount assembly 80 are shown. The reaction chamber 136 is like that shown in FIG. 4 and could be used with treatment system 10, 110, or 210. Reaction chamber 136 comprises a sealed, water-tight housing 135 capped at both ends 137, 139 and having fittings 129, 133 that allow water and gasses to be introduced and removed from the reactor housing 135, and for electrical connections to be made with the high voltage electrode 138 and ground electrode 148. In this embodiment, a continuous stream of water 114 is pumped from a source in the water system being treated into the reactor housing 135 and then out through the top as treated water 150. As the water flows into the reactor housing 135, ozone gas 130 (preferably generated in the high voltage power supply 140 (not shown in FIG. 6)), may be introduced into the water using a venturi 121 or other type of gas injector/diffuser. The water/ozone mixture 124 then enters inlet port 129 where is it optionally mixed with compressed air 122 or other gases (which may be bubbled through a microbubbler, such as 120) prior to entering reactor housing 135. Disposed within reactor housing 135 is an electrode mount assembly 80 connected at one end to high voltage electrode 138 and at the opposite end to ground electrode 148. The potential difference between the high voltage electrode and the ground electrode results in a plasma discharge in the water between the high voltage base 82 and ground base 92, in an area referred to herein as the high voltage discharge area or zone or plasma discharge area or zone (shown as 101 on FIG. 6).

Figure 8:
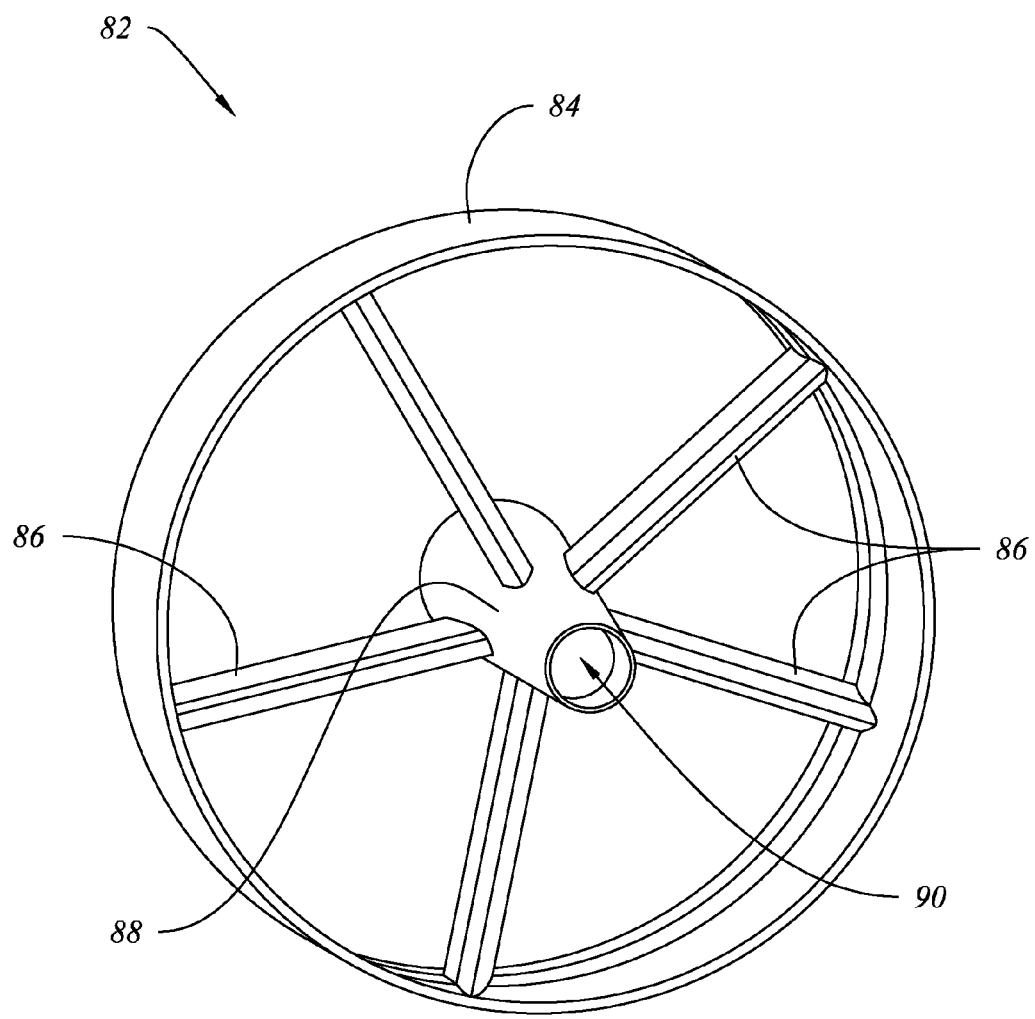
FIG. 8 is a bottom perspective view of a preferred embodiment of a high voltage mounting base according to the invention.

Referring to FIGS. 6-14, disposed within reactor housing 135 is an electrode mount assembly 80. Electrode mount assembly 80 preferably comprises a high voltage base 82, a ground base 92, and a ground electrode tube 147. The high voltage base 82 and ground base 92 are configured to hold the high voltage electrode and ground electrode at a fixed distance from each other, so that the electrode gap is around 1 to 10 mm, and most preferably around 5 mm. This distance allows a sufficient volume of water to be exposed to the plasma, particularly when the preferred ground electrode configuration as discussed below is used, while not requiring an increase in the output voltage from the high voltage generator. High voltage base 82 preferably has a wheel-shaped configuration comprising a central hub 88, a plurality of spokes 86 extending radially outward from hub 88 and terminating at outer ring or rim 84. Hub 88 preferably has a slightly tapered or truncated cone configuration (as shown in FIG. 8), but may also be substantially cylindrical. An opening 90 is disposed though hub 88 and high voltage wire 138 (or a thicker rod or conducting material connected to wire 138) fits within opening 90 to act as a high voltage electrode. Most preferably, high voltage wire 138 has a dielectric coating on its entire length to minimize parasitic electrochemical reactions.

Spokes 86 are preferably angled relative to hub 88 and rim 84 (as shown in FIGS. 6-7), which minimizes the contact area of the hub to the high voltage wire electrode, thereby increasing charge density on the electrode by reducing conduction through the plastic material of the hub. Rim 84 is preferably has a shape and size configured to mate with the shape and size of reactor housing 135 (or 35 or 235). Reactor housing is most preferably cylindrical, so rim 84 is also preferably cylindrical with a diameter slightly smaller than the inner diameter of reactor housing 135 so that high voltage base 82 may be inserted into the reactor housing 135 and will fit snugly against an internal wall of housing 135. The open wheel-like configuration of high voltage base 82 aids in eliminating any pressure choke points that could impede the plasma production.

Figure 9B:
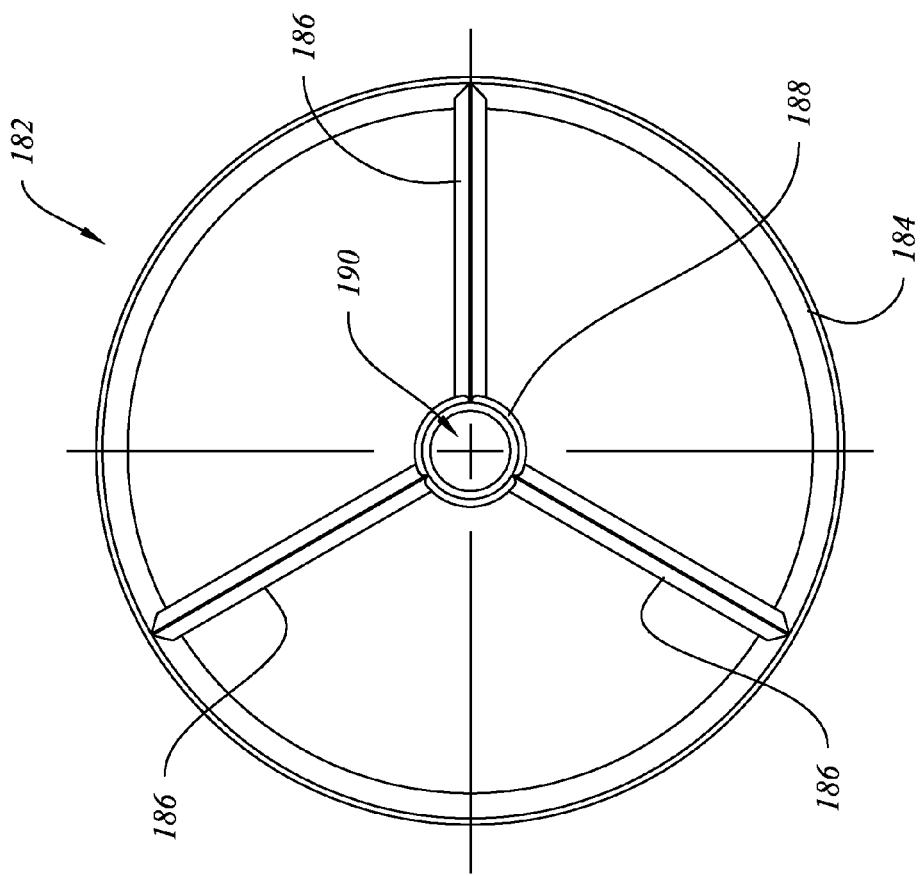
FIG. 9B is a top plan view of the high voltage mounting base of FIG. 9A.
Figure 9A:
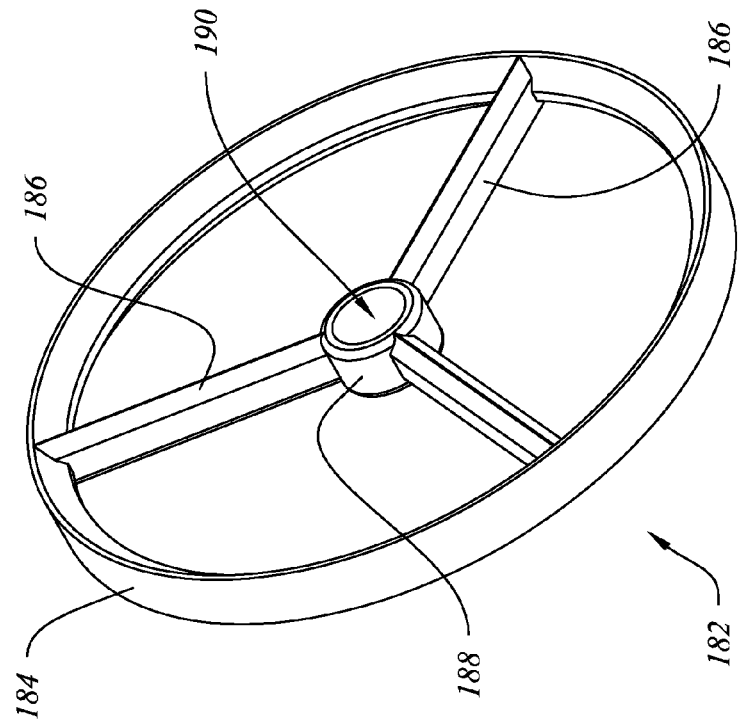
FIG. 9A is a bottom perspective view of another preferred embodiment of a high voltage mounting base according to the invention.
Figure 12:
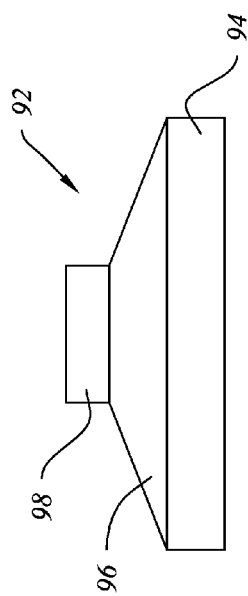
FIG. 12 is a front elevation view of the ground electrode mounting base of FIG. 9.
Figure 13:
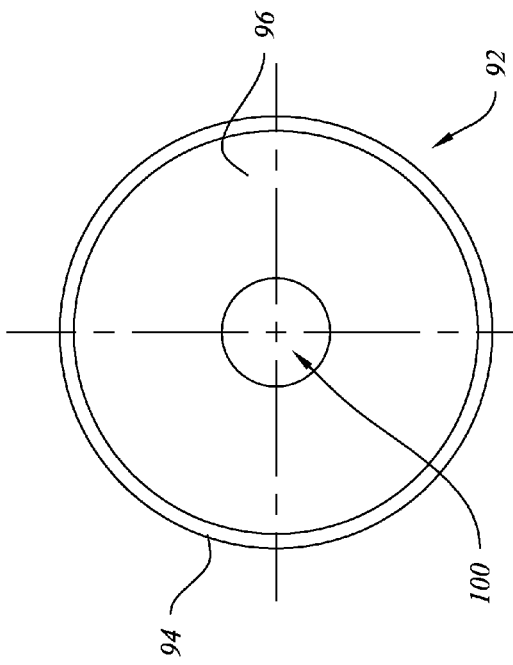
FIG. 13 is a bottom plan view of the ground electrode mounting base of FIG. 9.
Figure 10:
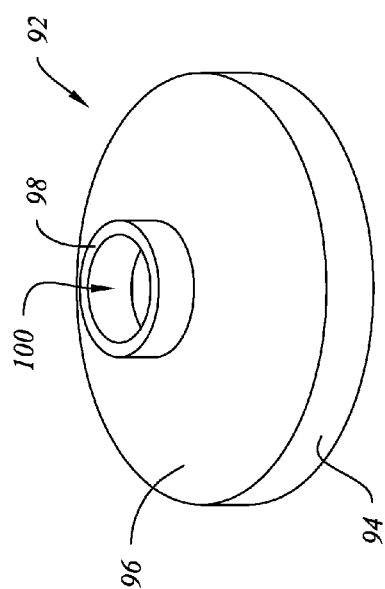
FIG. 10 is a top perspective view of a preferred embodiment of a ground electrode mounting base according to the invention.
Figure 11:
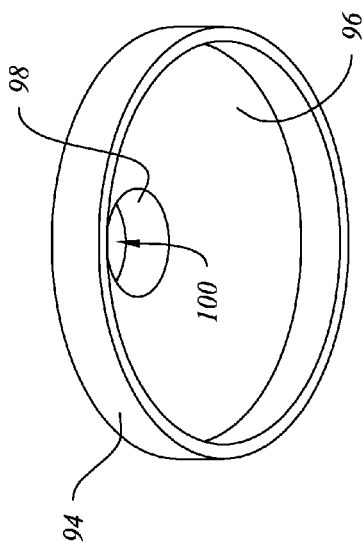
FIG. 11 is a bottom perspective view of the ground electrode mounting base of FIG. 9.

Another preferred embodiment of a high voltage base 182 for use with electrode mounting assembly 80 is shown in FIGS. 9A-9B. High voltage base 182 preferably comprises a central hub 188, a plurality of spokes 186 extending radially outward from hub 188 and terminating at rim 184. High voltage base 182 is similar to base 82, except in this embodiment hub 188 is preferably substantially cylindrical and spokes 188 are not angled relative to hub 188 and rim 184. A substantially cylindrical hub provides greater precision in the gap distance between the high voltage wire/ electrode and the ground electrode. A substantially cylindrical hub 188 may also be used with angled spokes, similar to FIGS. 6-7.

Referring to FIGS. 7 and 10-13, ground base 92 preferably comprises a rim 94, a body 96 extending from rim 94, and a collar 98 extending from body 96. An opening 100 is disposed through collar 98. Rim 94 preferably has a shape and size configured to mate with the shape and size of reactor housing 135 (or 35 or 235). Reactor housing is most preferably cylindrical, so rim 94 is also preferably cylindrical with a diameter slightly smaller than the inner diameter of reactor housing 135 so that ground base 92 may be inserted into the reactor housing 135 and will fit snugly against an internal wall of housing 135. Body 96 preferably has a closed, truncated cone or dome like shape, which aids in funneling any added gas bubbles into plasma discharge zone 101 and toward high voltage electrode 138.

Figure 14:
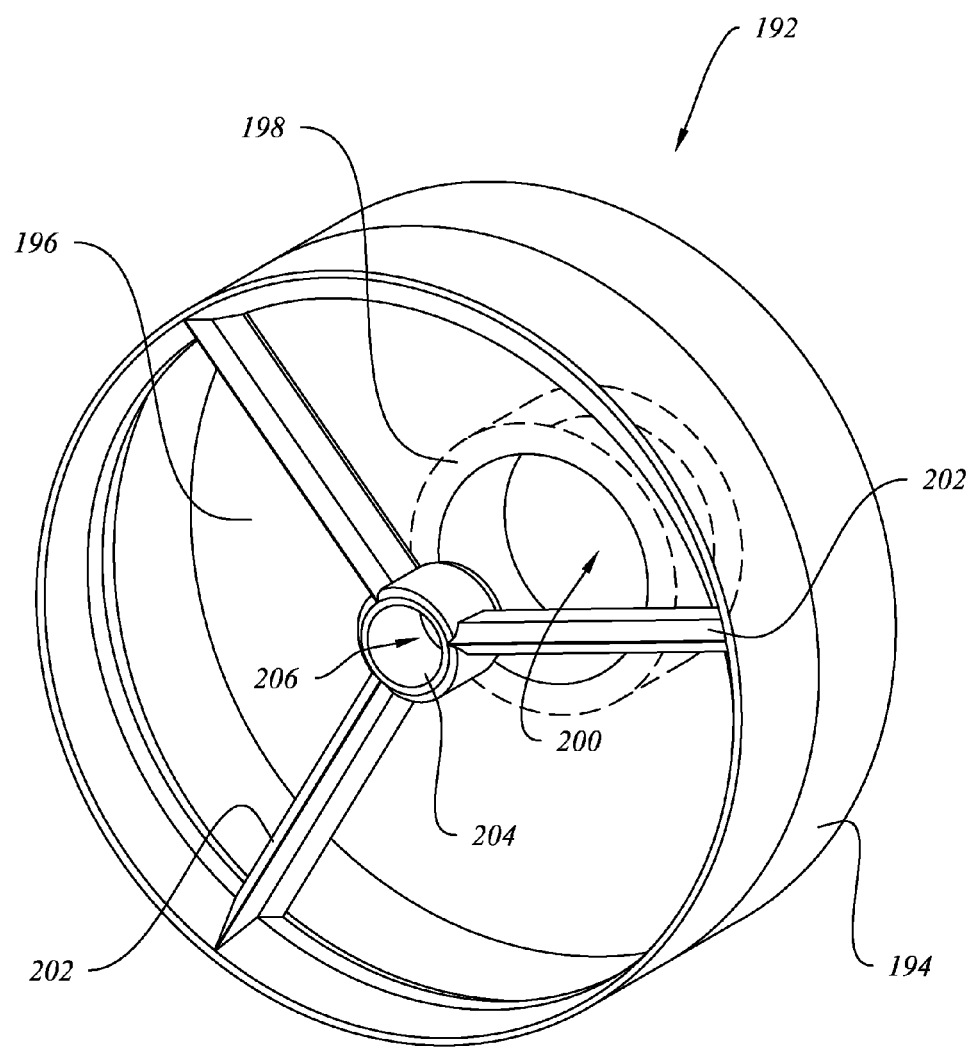
FIG. 14 is a bottom perspective view of another preferred embodiment of a ground electrode mounting base according to the invention.
Figure 16:
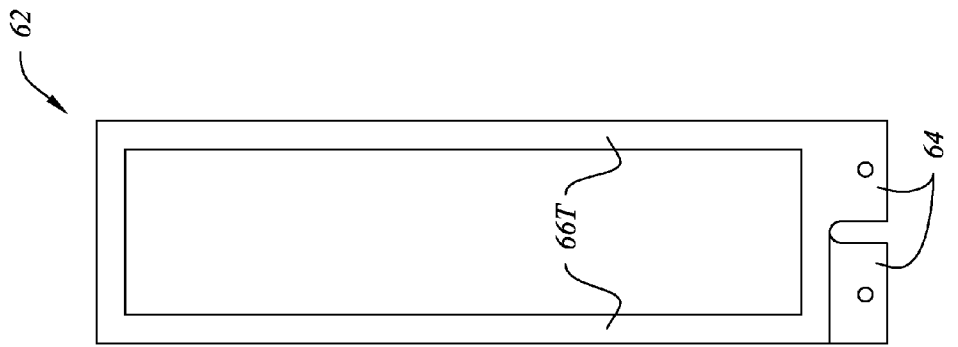
FIG. 16 is a top plan view of the Marx ladder support structure of FIG. 15.
Figure 15:
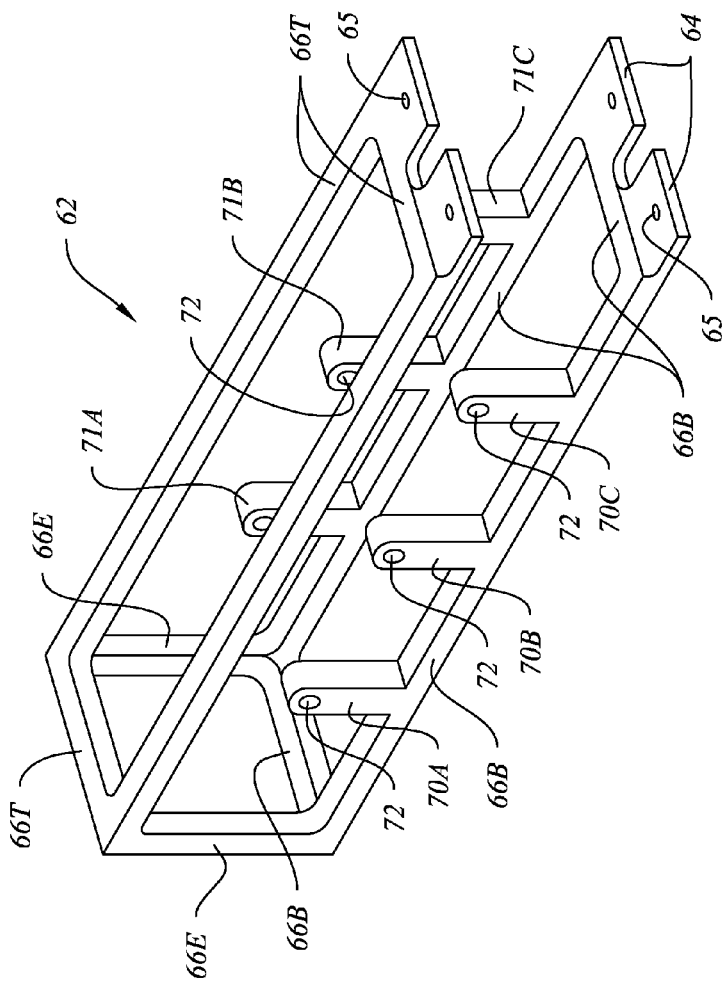
FIG. 15 is a perspective view of a preferred embodiment of a Marx ladder support structure according to the invention.
Figure 18:
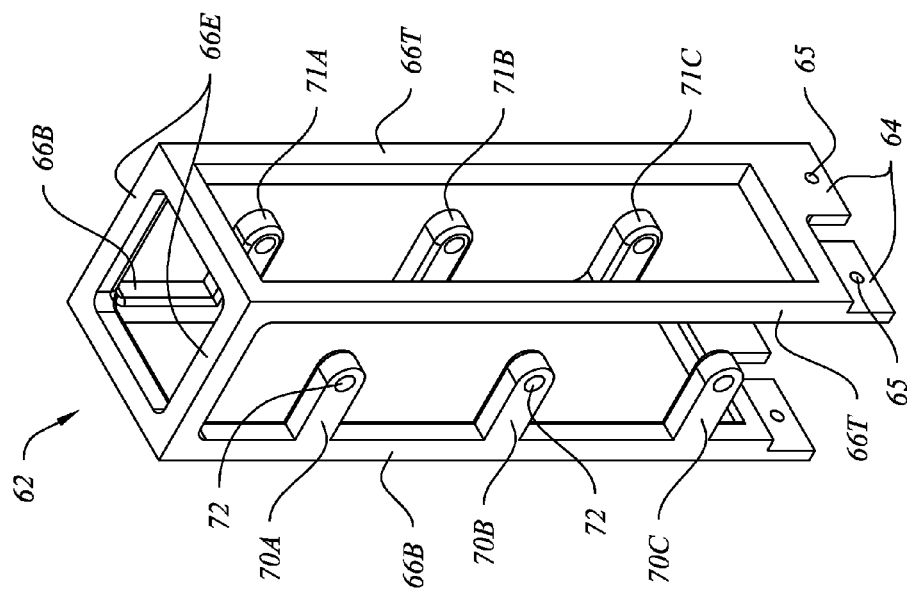
FIG. 18 is another perspective view of the Marx ladder support structure of FIG. 15.
Figure 17:
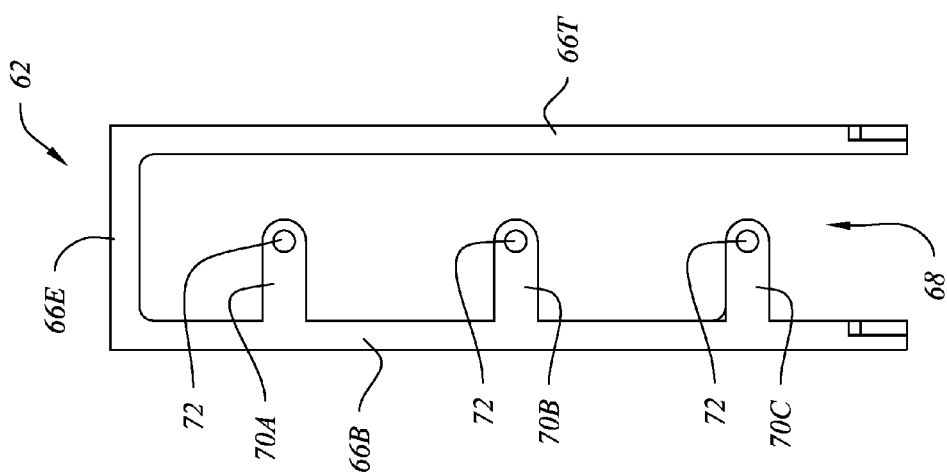
FIG. 17 is a side elevation view of the Marx ladder support structure of FIG. 15.

Another preferred embodiment of a ground base 192 is shown in FIG. 14. Ground base 192 preferably comprises a rim 194, a body 196 extending from rim 194, and a collar 198 extending from body 196, all similar to ground base 92. An opening 200 is disposed through collar 198. Unlike ground base 92, ground base 192 has an added wheel-like structure (similar to high voltage base 182). Ground base 192 also comprises a central hub 204, a plurality of spokes 202 extending radially outward from hub 204 and terminating at rim 194, and an opening 206 disposed through hub 204.

A ground wire 148 is disposed through opening 100 and connected to ground electrode tube 147. A tab with an aperture may be provided at an end of ground electrode tube 147 to facilitate connection to ground wire 148. Most preferably, ground electrode tube 147 (as shown in FIGS. 6-7) comprises a substantially cylindrical body (or other shape configured to be inserted in collar 98) or hollow tube with a plurality of openings 149 disposed through a sidewall of the body. Ground electrode tube 147 is preferably made of titanium, but other conductive materials, such as stainless steel or copper may also be used. Openings 149 are preferably circular having a diameter between about 4 mm and 8 mm; but other shapes may also be used. The size of the openings 149 are large enough to allow excess gas to escape and prevent a pressure choke point inside plasma discharge zone 101. Openings 149 have the advantage of greater field enhancement around the edges of the openings, which produce unformed field lines that enhance the effect of the field. Openings 149 also have the advantage of allowing the plasma discharges to be visible (as a bright light) when reactor housing 135 is clear or has a viewing window. An exterior sidewall of ground electrode tube 147 preferably has a dielectric barrier coating, such as non-conductive ceramic or glass, to reduce parasitic electrochemical reactions on the outer surface of ground electrode tube 147 and maximize the potential for generating a plasma in the plasma discharge zone 101.

Ground electrode tube 147 is most preferably configured to fit within collar 98 and within hub 88 (as shown in FIG. 7) to connect high voltage base 82 and ground base 92. Ground electrode tube 147 may be releasably attached to collar 98 and/or hub 88, such as by screws. Alternatively, ground electrode tube 147 may not extend all the way to hub 88 (as shown in FIG. 6). In that configuration, high voltage base 80 and ground base 92 are spaced apart by their relative locations within reactor body 135 and held in place by friction, another structure extending from ground electrode base to high voltage base, or other means, such as a lip or other protrusion within reactor body 135 configured to mate with rims 94 and 84, to position high voltage electrode 138 relative to ground electrode tube 147. A lower end of high voltage electrode 138 is disposed through hub 88 and into ground electrode tube 147. Although high voltage electrode 138 may extend all the way to ground electrode base 92 or substantially through the length of ground electrode tube 147 (as shown in FIG. 6), most preferably high voltage electrode 138 extends into tube 147 only a short distance of around 4 to 30 mm (as shown in FIG. 7) to avoid having the high voltage electrode interfere with the flow of water through reactor body 135. High voltage electrode 138 and ground electrode tube 147 are preferably sized and configured to provide a gap between the two electrodes of around 1 to 10 mm, and most preferably around 5 mm. In the configurations shown in FIGS. 6-7, where high voltage electrode 138 is a rod partially disposed within and substantially concentric within ground electrode tube 147, the gap is the radial distance between an outer wall of the high voltage electrode and an inner wall of ground electrode tube 147. Ground electrode tube 147 is most preferably around 2 to 4 inches in length. Having a relatively shorter electrode allows for greater charge concentration, which helps with the discharge.

High voltage wire 138 and ground wire 148 are preferably made of solid metal, rather than braided wire. This makes connections easier because a solid wire is easier to seal in end fittings 137, 139 or ports 129, 133. Solid wiring also eliminates potential problems with water wicking from the reactor housing 135 to an inner wire core, which could be dangerous.

Electrode mounting assembly 80, and any variation on the components of assembly 80, may be used with any reaction chamber/housing in any treatment system and method according to the invention, including reactor housing 35, 135, and 235. The preferred electrode mount and ground electrode configuration as shown in FIGS. 6-7 allow plasma to be generated under a range of water chemistry conditions. For example, as the conductivity of the water increases with cycles of re-circulation, the amount of air/gas/ozone that can be delivered to the plasma discharge zone 101 can be increased by simply changing the gas flow rate. Increased gas flow rate corresponds to an increase in the gas phase dielectric barrier to achieve greater plasma discharge under high conductivity conditions, without having to alter the distance between the electrodes or increase the voltage between the ground and high voltage electrode.

A series of tests were performed with a gas infusion system, reaction chamber, and electrode mount assembly similar to that shown in FIG. 6. The water system used was a cooling tower located at a local university and the water had a conductivity range of 980 mmhos to 1900 mmhos. The treatment system was run continuously over a 4 month period. The discharge voltage was set at 240 kV and the electrode gap between the high voltage and ground electrodes was 5 mm. The reactor housing was made of transparent material so the inside of the housing was visible. During operation, plasma discharge between the ground and high voltage electrode and bubbles being forced into the space between the ground and high voltage electrode were both observed. Once the conductivity increased to over 1000 mmhos, plasma discharge was not observed with the use of bubbles introduced through the venturi alone; however, plasma discharge was again observed once additional compressed air was introduced into the space between the ground and high voltage electrodes.

A preferred embodiment for a support structure 82 for a Marx generator used in any high voltage generator according to the invention, such as high voltage generator system 40, 140, or 240, is shown in FIGS. 15-18. Support structure 62 preferably comprises upper support arm 66T, lower support arm 66B, and one or more end support arms 66E extending between lower support arm 66B and upper support arm 66T. Upper support arm 66T preferably forms a substantially rectangular shape with an open central portion. Similarly, lower support arm 668B preferably forms a substantially rectangular shape with an open central portion. Vertical end support arms 66E connect the upper and lower support arms 66T and 66B at one end of the support structure 62 to form a generally U-shaped frame. The other end of the support structure 62 is preferably substantially open, with no vertical connectors to join arms 66T and 66B. Attachment tabs 64 are preferably disposed at one end of support structure 62, extending outwardly from each of the top and bottom support arms 66T and 66B. Disposed through tabs 64 are apertures 65. Tabs 64 and apertures 65 facilitate securing the support structure 62 to a bottom surface of spark gap chamber 41 or outer housing 43, depending on the configuration of chamber 41 and housing 43, or to a capacitor bank housing 77 disposed within spark gap chamber 41 or outer housing 43. Support structure 62 may also be integrally formed from a single part with spark gap chamber 41 or outer housing 43.

Figure 20:
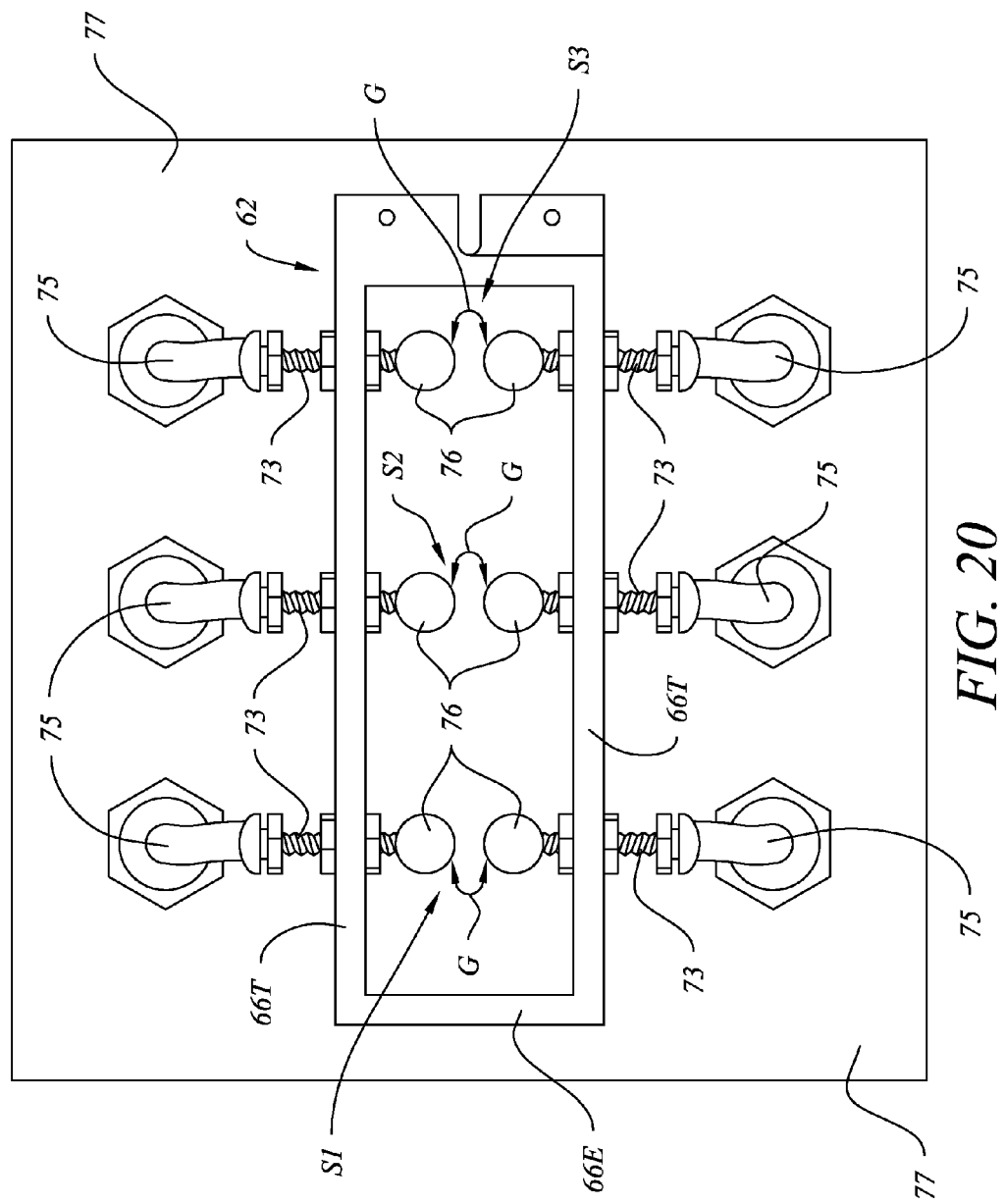
FIG. 20 is a top plan view of a portion of the high voltage generator system of FIG. 19.
Figure 21:
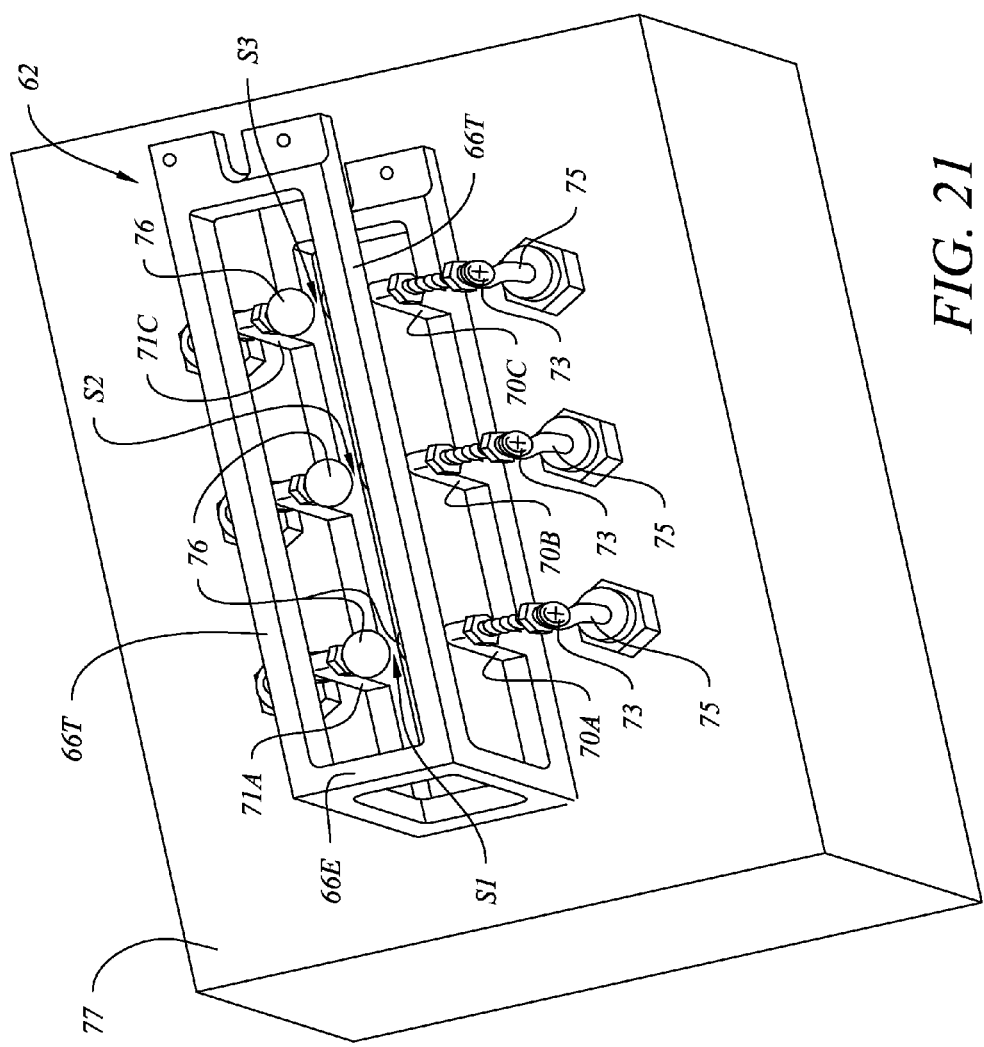
FIG. 21 is a perspective view of a portion of the high voltage generator system of FIG. 19.

Extending upwardly from each lower support arm 66B are a plurality of paired posts 70A-71A, 70B-71B, and 70C-71C. A plurality of first posts 70A, 70B, and 70C extend from a first side (forward side) of lower support arm 66B and a plurality of second posts 71A, 718, and 71C extend from a second (rearward) side of lower support arm 66B. With reference to FIGS. 20-21 (which show the Marx ladder support structure 62 on capacitor bank housing 77, with connections between the two), and the circuit diagram of FIG. 22. (which is representative of a typical circuit for a Marx generator or Marx ladder, that may be connected to support structure 62), a spark gap switch (S1, S2, etc.), comprising two spaced apart electrodes 76, is disposed between each pair of posts, such that S1 is between 70A and 71A and S2 is between 70B and 71B, etc. Disposed through each post is an aperture 72, though which a spark gap electrode mount 73 is disposed. A spark gap electrode 76 is attached at an end of the spark gap electrode mount 73 disposed inside support structure 62. This forms a plurality of spark gap electrode pairs between each pair of posts 70A-71A, 70B-71B, etc. The electrodes 76 and mounts 73 are preferably configured to allow the electrode to move laterally along the mount to selectively adjust the gap distance between each pair of spark gap electrodes. Most preferably, the spark gap electrode mounts 73 comprise a screw on to which each electrode 76 is attached in threaded engagement on an end of the mount 73 disposed within Marx ladder support structure 62. This preferred configuration allows the relative positions of each pair of electrodes 76 to be selectively modified to move them closer together or farther apart within Marx ladder structure 62 to increase or decrease the spark gap distance by simply rotating the electrodes 76 along the length of mount 73. Most preferably the spark gap distance between each pair of electrodes 76 is around 15 to 40 mm. Alternatively, each spark gap electrode 76 may be fixed at an end of each mount 73 within structure 62 and the mounts 73 may be configured for lateral movement relative to posts 70, 71 to selectively adjust the gap distance. A combination of adjustable electrodes and adjustable mounts may also be used.

Most preferably, Marx ladder structure 62 rests on a capacitor bank housing 77. Within capacitor bank housing 77 are a plurality of capacitors and resistors connected together according well-known Marx ladder circuitry. A plurality of apertures are disposed through an upper end or removable cover of housing 77 to allow wiring 75 is pass in order to connect the capacitors to the spark gap switches. An end of each mount 73 disposed outside the Marx ladder structure 62 is connected by wiring 75 to capacitors within a capacitor bank housing 77, such that capacitor C1 is connected to the mounts 73 on post pair 70A-71A, capacitor C2 is connected to the mounts 73 on post pair 70B-71B, and so forth. Most preferably, 3 to 6 pairs of posts are provided for structure 62, but additional pairs may be provided as needed to generate sufficient voltage as will be understood by those of ordinary skill in the art. For example, there would be five pairs of posts for a circuit as shown in FIG. 22, one pair for each spark gap switch S1-S5. Variations in these arrangements may be made, as will be understood by those of ordinary skill in the art.

The dimensions of structure 62 are preferably around 2 inches wide by 2 inches high and 3 inches wide by 3 inches high, for a 14 inch length. As described herein, width is a dimension substantially between a pair of posts 70-71, height is the dimension of vertical support arms 66E in a direction from lower support arm 66B toward upper support arm 66T, and length is the longer dimension of support arms 66T, 66B in a direction from vertical support arms 66E toward tabs 64. These dimensions are preferred in order to physically separate the spark gap electrodes to aid in preventing the spark gaps from being bridged by metal deposits, which would disrupt generation of the high voltage pulse in the Marx ladder. Most preferably, the gap distance between the spark gap electrodes 76 (the distance between a pair of electrodes 73 on each pair of posts 70-71, as shown on FIG. 20 as G) is around 15 mm to 40 mm, and most preferably around 27 mm. The gap distance may be selectively increased or decreased by moving electrodes 76 on electrode mounts 73, which changes the voltage produced by the high voltage generator. Additionally, other sizes for the support structure 62 may be used to scale the spark gap dimensions, particularly if a larger gap than what is achievable by variation of distance on mounts 73 is desired. Additionally, larger widths and heights may be used, but it is believed that much larger than 3×3 does not offer any significant advantage to overall system operation because metal deposition in the channel is no longer a factor in system failure at larger dimensions.

The support arms 66T, 66B, and 66E form a substantially open support structure frame. Many prior art Marx ladders are in enclosed structures, which can result in problems such as parasitic discharge as a result of metal depositing on the walls of the Marx chamber or support structure. By having a substantially open structure for a support frame 62, these problems are avoided. For example, by moving away from the closed support structure and moving to an open support system that physically isolates the spark gap electrodes from each other. With the configuration of the preferred support structure 62, including the preferred dimensions, any metal deposits resulting from the spark gap discharge cannot make a bridge between the electrodes and therefore cannot interfere with the discharge timing.

Support structure 62 is preferably made of ozone resistant materials, such as teflon, ABS, or fiberglass. Since ozone is generated by the Marx ladder, it is preferred to use such resistant materials to fabricate the support structure 62 to avoid damaging the structure. Using materials that are susceptible to being attacked by ozone can weaken the support structure of the spark gap electrodes and with a repeated, substantially continuous fire use needed for treating flowing water systems according to the invention, this weakened structure can undergo mechanical failure and break. It is also preferred to coat the surfaces of support structure 62 with oil, such as mineral oil or silicon oil. The oil will aid in preventing any metal from the spark gap electrodes from depositing onto to surfaces of support structure 62. If deposits are observed they can be easily cleared away by wiping the oil layer off and reapplying a fresh coating. Additionally, it is preferred that lower support arm 66B, a lower portion of posts 70, 71, and a lower portion of vertical end support arms 66E be submerged in an oil bath 74, as shown in FIG. 19.

Referring to FIGS. 19-21, a preferred housing configuration for high voltage generator system 40 is shown. High voltage generator system 40 preferably comprises an outer housing 43, a spark gap chamber 41, and a Marx ladder 42. Marx ladder 42 preferably comprises a support structure 62, a capacitor bank housing 77, a low voltage driver circuit 39, a plurality of capacitors C, resistors R, and spark gap electrodes 76. Connections through outer housing 43 are provided for connecting an external power source (such as a wall outlet) to driver circuit 39 and for connecting air pumps 44 to spark gap chamber 41 and for withdrawing ozone (and other components of air) from within spark gap chamber 41.

Outer housing 43 is preferably a structure configured to enclose spark gap chamber 41 and Marx ladder 42. It preferably has a removable cover or top or an openable door to allow access to the interior of the housing 43 and access to spark gap chamber 41. Outer housing 43 is preferably made from polycarbonate, lexan or another rigid polymer, but other materials may be used. Outer housing 43 also preferably includes a dielectric barrier to isolate the Marx ladder 42 from the surrounding environment and prevent arcing from the internal components to nearby metal structures, electrical outlets, and other monitoring and control systems. Such a dielectric barrier may be a separate layer of material or coating on an inside or on an exterior of housing 43.

Capacitor bank housing 77 preferably has a removable upper cover or openable door to allow access to the capacitors C and resistors R within the housing. Apertures are provided in the upper cover of housing 77 to allow wires to connect the capacitors to spark gap electrodes 76 through spark gap electrode mounts 73. Another aperture is disposed through housing to connect the capacitor bank to low voltage driver circuit 39. Housing 77 is preferably configured to contain an oil bath 74 having sufficient volume to at least partially submerge the capacitors. Mineral oil or silicon oil may be used for oil bath 74. Capacitor bank housing 77 may be disposed within spark gap chamber 41 or may be external to spark gap chamber 41.

Spark gap chamber 41 may comprise another structure to enclose at least the Marx ladder support structure 62 and may enclose other components of the Marx ladder 42. Spark gap chamber 41 preferably has a removable top or cover or openable door so that support structure 62 (or other components of Marx ladder 42 within spark gap chamber 41) may be accessed. In that configuration, lower support arm 66B of Marx ladder support structure 62 would rest on a bottom surface of spark gap chamber 41. Alternatively, spark gap chamber may be a removable cover that fits over support structure 62 (and may fit over other components of Marx ladder 42) but does not have a bottom structure. In that configuration, lower support arm 66B of support structure 62 for high voltage generator 42 would rest on an upper surface of capacitor bank housing 77 (or alternatively on a bottom surface of outer housing 43). If a removable cover is used, a seal is preferably provided to allow ozone to be pumped or suctioned out of spark gap chamber 41. An interior surface of spark gap chamber 41 and any piping or conduit used to transport the ozone generated by the high voltage generator 42 to reaction chamber 36 are preferably made of ozone resistant materials, such as teflon, ABS, or fiberglass. The use of such resistant materials to fabricate these parts is preferred to avoid damaging them by exposure to ozone. A second oil bath 74 is optionally disposed in the bottom of spark gap chamber 41 or outer housing 43 or may be disposed in a separate tray or other container (not shown) for Marx ladder support structure 62. Oil bath 74 preferably has sufficient volume so that lower support arm 66B, a lower portion of posts 70, 71, and a lower portion of vertical end support arms 66E are submerged in the oil. Mineral oil or silicon oil may be used for oil bath 74. Support structure 62 is also preferably coated in oil. Outer housing 43 may be configured to act as a housing for high voltage generator system 40 and a spark gap chamber, so that a separate spark gap chamber 41 is not required with modifications as will be understood by those of ordinary skill in the art. A configuration without a separate spark gap chamber may be particularly useful when a primary outer housing is provided to contain both the high voltage generator system and reaction chamber (such as housing 260, which contains high voltage generator system 240 and reaction chamber 236).

Various apertures or ports are disposed through sidewalls on outer housing 43, spark gap chamber 41, and capacitor bank housing 77 to allow power to be supplied to the Marx ladder 42 from power system 46, to allow voltage to be carried from the Marx ladder 42 to reaction chamber 36, to allow air to be blown into spark gap chamber 41 from air pumps/compressors 44 through a conduit 47, and to allow ozone 30 to be removed. Air pumps 44 may be used to cool high voltage generator 42, pressurize the spark gap chamber 41, and/or to remove ozone (force ozone out of spark gap chamber or outer housing) through a conduit or piping. A venturi or vacuum pump may also be used to remove ozone from spark gap chamber by suction and to pressurize spark gap chamber.

Most preferably, spark gap chamber 41 (or outer housing 43 if a separate spark gap chamber is not used) is maintained at a reduced pressure or a negative pressure, less than 1 atmosphere, which supports intermittent firing of the spark gaps to periodically generate a high voltage pulse. Typical Marx ladder generators are operated at pressures greater than 1 atmosphere. The treatment systems and methods according to the invention require substantially continuous high voltage generation (repeated cycles of charging and discharging, preferably with some period of deactivation for cooling between each repeated cycle) in order to treat a flowing or re-circulating water system. In order to operate a Marx ladder according to the invention, such as 42, 142, or 242, in such a substantially continuous operation mode, it is preferred to reduce the pressure or operate in a vacuum, which allows the system to multiply at lower voltages and extends the life of the Marx ladder.

Any of the components of treatment systems according to the invention described herein, including various gas infusing system components, electrode mount assembly 80, and Marx ladder support structure 62, may be used together in any combination with other components or other embodiments within the scope of the invention. Any particular treatment system embodiment, such as treatment systems 10, 110, and 210, is not limited to only those components and configurations specifically described with respect to that embodiment.

A preferred method of treating water in a flowing or re-circulating water system comprises generating a high voltage pulse in a high voltage generator preferably comprising a Marx ladder, directing the high voltage pulse to a high voltage electrode disposed in proximity to a ground electrode with a flow of water to be treated passing between the ground and high voltage electrodes, and generating a plasma discharge in the flowing water in a plasma discharge zone disposed between and around the high voltage and ground electrodes. Most preferably, water flows continuously through the discharge zone and plasma is periodically generated (around every 15 minutes) based on periodic operation of the Marx ladder. According to another preferred embodiment, a method of treating water further comprises injecting air or other gas into the plasma discharge zone. According to yet another preferred embodiment, a method comprises capturing ozone gas, which is produced as a by-product in generating the high voltage pulse in the Marx ladder, and injecting the ozone into the plasma discharge zone. Most preferably, the injection of air or gas increases as the level of conductivity in the water increases with repeated cycles of re-circulation. A preferred method further comprises pumping air over or suctioning air through a housing for the Marx ladder to aid in cooling the components of the Marx ladder, flushing ozone from within the housing, and pressurizing the housing and the Marx ladder is preferably operated under reduced pressure or vacuum conditions. A preferred method further comprises protecting various components of the water system from interference or damage that may be caused by the high voltage pulse generation or plasma discharge. Additionally, excess energy produced by a high voltage discharge is captured and used to further condition the water in the water system. Most preferably, methods of treating water according to the invention use components of the water treatment systems described herein.

According to another preferred method, the conductivity of the water is periodically measured (which measurements may be performed by existing equipment in the water system or equipment incorporated into a treatment system) and one or more parameters of treatment are modified or adjusted when the conductivity level reaches a predetermined threshold. These operating parameters may be adjusted by (1) moving the high voltage electrode and the ground electrode closer together; (2) increasing a voltage of the high voltage pulse supplied to the high voltage electrode; (3) increasing a rate of adding bubbles into the flowing water stream; or (4) reducing the pressure of the flowing water stream at the outlet of the reaction chamber. Any combination of steps may be used to aid in plasma generation under high water conductivity conditions.

References herein to water systems include any type of flowing water system, including industrial, commercial, and residential, that requires periodic treatment to control or eliminate growth of microbiological species. Water flowing through the water system may contain contaminants or chemical or biological treatment agents. References herein to continuous or substantially continuous and the like refer to operations of a treatment system according to the Invention over a prolonged period of time, with repeated cycles of activation/deactivation of treatment system components, as occurring during normal operating periods of the water system and treatment system and not during times of shut-down (such as seasonal shut-down of the water system or shut-down of the water system or treatment system for maintenance). The components depicted in the figures are not drawn to scale but are merely intended as representations of the various components used in preferred embodiments of treatment systems according to the invention and water systems with which those treatment systems are used. Additionally, certain components of the water systems depicted in the figures may be in other locations relative to other components of the water systems and the systems of the invention than as depicted in the drawings. Those of ordinary skill in the art will appreciate upon reading this specification, that modifications and alterations to the system and methods for treating flowing water with a plasma discharge and ozone while protecting the components of the water systems may be made within the scope of the invention and it is intended that the scope of the invention disclosed herein be limited only by the broadest interpretation of the appended claims to which the inventors are legally entitled.

What is claimed is:

1. A treatment system for treating water in a flowing water system with a plasma discharge and ozone, the treatment system comprising:
    a high voltage generator comprising a plurality of capacitors, resistors, and spark gap electrodes configured in a Marx ladder circuit, a support structure for the spark gap electrodes, and a housing;
    a reaction chamber comprising an inlet configured to receive at least a portion of water flowing through the water system as water to be treated, an outlet configured to return the portion of water back to the water system after being treated with a plasma discharge and optionally ozone, and a reactor body;
    a gas infusion system disposed upstream of the inlet or within the reaction chamber to add bubbles of one or more gases into the water to be treated;
    a high voltage electrode and a ground electrode at least partially disposed in the reaction chamber and configured to generate a plasma discharge within the water in the reactor body when a high voltage pulse is produced by the high voltage generator;
    an electrode mounting assembly disposed within the reaction chamber, the electrode mounting assembly configured to hold the high voltage electrode and the around electrode within the reactor body;
    an optional conduit configured to deliver ozone gas produced in the high voltage generator from the housing to the gas infusion system; and
    wherein at least a part of the high voltage electrode is configured to contact the water in the reactor body while the high voltage pulse is transmitted from the high voltage generator.

2. The treatment system of claim 1 wherein the electrode mounting assembly comprises:
    a high voltage mounting base comprising a first central hub configured to receive the high voltage electrode, a first outer rim configured to mate with an interior wall of the reaction chamber, a plurality of spokes extending outwardly from the central hub toward the first outer rim
    and a ground mounting base comprising a second central hub configured to receive the around electrode, a second outer rim configured to mate with the interior wall of the reaction chamber, and a substantially closed body disposed between the second hub and second outer rim.

3. The treatment of claim 2 wherein the substantially closed body of the ground electrode mounting base has a funnel or dome shape.

4. The treatment system of claim 2 wherein the high voltage mounting base and ground mounting base are configured to hold the high voltage electrode a fixed gap distance between around 1 and 10 mm from the ground electrode.

5. The treatment system of claim 4 wherein the ground electrode comprises a substantially cylindrical and conductive tube having a plurality of apertures disposed through a sidewall of the tube, wherein the tube extends from the second hub toward the high voltage mounting base.

6. The treatment system of claim 5 wherein the high voltage electrode comprises a rod that is at least partially disposed within and substantially concentric with the ground electrode tube and wherein the gap distance is a radial distance between an exterior surface of the rod and interior surface of the tube.

7. The treatment system of claim 6, wherein around 4 to 30 mm of the rod is disposed within the ground electrode tube.

8. The treatment system of claim 5 wherein an exterior surface of the tube is coated with a dielectric barrier material.

9. The treatment system of claim 1 wherein the support structure for the spark gap electrodes comprises:
    an upper support arm having a substantially rectangular configuration with an open central portion,
    a lower support arm having a substantially rectangular configuration with an open central portion,
    one or more vertical support arms connecting the upper support arm to the lower support arm in a spaced-apart relationship;
    a plurality of spaced-apart post pairs, each pair comprising a first post extending vertically from a first side of the lower support arm and a second post extending vertically from a second side of the lower support arm substantially opposite the first side.

10. The treatment system of claim 9 wherein the upper support arm, lower support arm, and vertical support arms form an open, substantially U-shaped frame.

11. The treatment system of claim 9 wherein the support structure has dimensions of around 2 inches wide by 2 inches high to 3 inches wide by 3 inches high.

12. The treatment system of claim 9 wherein the support structure further comprises a plurality of electrode mounts, each mount extending inwardly from each of the first posts and each the second posts of the spaced-apart post pairs,
    wherein each electrode mount is attached to one of the spark gap electrodes to form a plurality of electrode pairs between each spaced-apart post pair; and
    wherein a gap distance between the spark gap electrodes in each electrode pair is around 15 mm to 40 mm.

13. The treatment system of claim 12 wherein the spark gap electrodes are configured to move laterally along the electrode mounts to selectively adjust the gap distance.

14. The treatment system of claim 13 wherein the electrode mounts comprises threads configured to mate with threads on the spark gap electrodes so that the spark gap electrodes may be rotated to achieve lateral movement along the electrode mounts.

15. The treatment system of claim 12 wherein the electrode mounts are configured to move laterally relative to the posts to selectively adjust the gap distance.

16. The treatment system of claim 1 further comprising an oil bath disposed within the housing.

17. The treatment system of claim 16 wherein the support structure comprises a lower support arm disposed below the spark gap electrodes and the lower support arm is submerged in the oil bath.

18. The treatment system of claim 16 wherein the capacitors are at least partially submerged in the oil bath.

19. The treatment system of claim 1 wherein the surfaces of the support structure are coated with oil.

20. The treatment system of claim 1 further comprising a venturi or vacuum pump to draw ozone generated in the high voltage generator into the conduit for delivery to the gas infusing system.

21. The treatment system of claim 1 further comprising an air pump to blow air through the high voltage generator.

22. The treatment system of claim 1 wherein for treating water in a flowing water system is a recirculating water system and wherein a conductivity level of the water in the recirculating water system increases as it recirculates and the gas infusion system is configured to begin supplying or increase an amount of gas supplied into the reactor body to generate the plasma discharge in the water as the conductivity level increases.

* * * * *

UNITED STATES PATENT AND TRADEMARK OFFICE
CERTIFICATE OF CORRECTION

PATENT NO. : 9,932,252 B2  
APPLICATION NO. : 14/695519  
DATED : April 3, 2018  
INVENTOR(S) : Adrian J. Denvir et al.

Page 1 of 1

It is certified that error appears in the above-identified patent and that said Letters Patent is hereby corrected as shown below:

In the Claims

Column 28, Line 46, "around" should read --ground--

Signed and Sealed this
Ninth Day of April, 2019

Andrei Iancu
*Director of the United States Patent and Trademark Office*